(12) United States Patent
Huberman et al.

(10) Patent No.: US 11,088,568 B2
(45) Date of Patent: Aug. 10, 2021

(54) SYSTEM AND METHOD FOR DISTRIBUTED, SECURE, POWER GRID DATA COLLECTION, CONSENSUAL VOTING ANALYSIS, AND SITUATIONAL AWARENESS AND ANOMALY DETECTION

(71) Applicant: CABLE TELEVISION LABORATORIES, INC., Louisville, CO (US)

(72) Inventors: Bernardo Huberman, Palo Alto, CA (US); Scott H. Clearwater, Menlo Park, CA (US); Scott L. Caruso, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/727,077

(22) Filed: Dec. 26, 2019

(65) Prior Publication Data

US 2020/0136431 A1 Apr. 30, 2020

Related U.S. Application Data

(63) Continuation-in-part of application No. 16/513,676, filed on Jul. 16, 2019.

(Continued)

(51) Int. Cl.
*G08C 19/22* (2006.01)
*H04Q 9/00* (2006.01)
(Continued)

(52) U.S. Cl.
CPC .. *H02J 13/00006* (2020.01); *H02J 13/00002* (2020.01); *H04L 41/0681* (2013.01); *H04L 67/12* (2013.01)

(58) Field of Classification Search
CPC .......... H02J 13/00006; H02J 13/00002; H02J 2310/14; H02J 13/00016; H02J 3/38;
(Continued)

(56) References Cited

U.S. PATENT DOCUMENTS

| 10,892,838 B2 | 1/2021 | Cruickshank, III et al. |
| 2012/0265355 A1* | 10/2012 | Bernheim ............... H02J 50/10 700/286 |

(Continued)

FOREIGN PATENT DOCUMENTS

CN 103293421 A 9/2013

OTHER PUBLICATIONS

Meng Zhou, Lanlan Rui, Xuesong Qium Zhe Xia, Biyao Li, Evaluation of the Node Importance in Power Grid Communication Network and Analysis of Node Risk, Apr. 23-27, 2018, pp. 1-5 (Year: 2018).*

*Primary Examiner* — Tanmay K Shah
(74) *Attorney, Agent, or Firm* — David Daniel Smith; Cable Television Laboratories, Inc.

(57) ABSTRACT

A system and method for data collection and aggregation using a distributed network of communications enabled sensors connected to another primary network to achieve a secondary out-of-band monitoring perspective, for example, in power grids. The data collection system includes an aggregation and processing server configured to collect data from a variety of sensors adjacent to the monitored network each sensor includes secondary power such that it can continue data transmission even during power grid outages. The data collection system includes a method for secure real-time data ingest, machine learning enabled analysis, risk assessment, and anomaly detection on a broad geographic scale irrespective of isolated network boundaries.

14 Claims, 10 Drawing Sheets

Related U.S. Application Data

(60) Provisional application No. 62/698,694, filed on Jul. 16, 2018, provisional application No. 62/789,396, filed on Jan. 7, 2019, provisional application No. 62/785,658, filed on Dec. 27, 2018.

(51) Int. Cl.
*H02J 13/00* (2006.01)
*H04L 29/08* (2006.01)
*H04L 12/24* (2006.01)

(58) Field of Classification Search
CPC . H04L 67/12; H04L 41/0681; H04L 43/0805; H04L 43/08; H04L 41/147; H04L 41/145; Y02B 90/20; Y02B 70/3225; Y02B 70/30; Y04S 20/242; Y04S 20/221; Y04S 20/222; Y04S 40/124; Y04S 40/00
USPC .................................................. 340/870.07
See application file for complete search history.

(56) References Cited

U.S. PATENT DOCUMENTS

| | | | |
|---|---|---|---|
| 2018/0159879 A1* | 6/2018 | Mestha | G06N 20/00 |
| 2018/0260561 A1* | 9/2018 | Mestha | G05B 23/0275 |
| 2020/0218973 A1 | 7/2020 | Pi et al. | |

* cited by examiner

SYSTEM AND METHOD FOR DISTRIBUTED, SECURE, POWER GRID DATA COLLECTION, CONSENSUAL VOTING ANALYSIS, AND SITUATIONAL AWARENESS AND ANOMALY DETECTION

RELATED APPLICATIONS

This application is a continuation in part of U.S. application Ser. No. 16/513,676, filed Jul. 16, 2019, and entitled "SYSTEM AND METHOD FOR DISTRIBUTED, SECURE, POWER GRID DATA COLLECTION, CONSENSUAL VOTING ANALYSIS, AND SITUATIONAL AWARENESS AND ANOMALY DETECTION," which claims the benefit of U.S. Provisional Application No. 62/698,694, filed Jul. 16, 2018, and U.S. Provisional Application No. 62/789,396, filed Jan. 7, 2019. This application also claims the benefit of U.S. Provisional Application No. 62/785,658, filed Dec. 27, 2018, and U.S. Provisional Application No. 62/789,396, filed Jan. 7, 2019. Each of these applications are expressly incorporated by reference herein in their entirety.

BACKGROUND

The field of the disclosure relates to real-time and interval data collection using massive distributed sensor networks, analysis, and anomaly detection for, in one implementation, power grid systems.

Current monitoring sensor technologies are limited by the need for sufficient power (either wired or through batteries), communications capabilities, and real estate at appropriate locations for effective data collection. Power grids are traditionally monitored through costly installation of new sensors with wireless communication capabilities or through monitoring equipment located at power substations. Both solutions are costly and plagued by delayed data reporting, loss of power when the energy grid suffers a failure, and course data resolution. For example, a single monitored substation may typically serve roughly 1000 or more homes. When power fails at these sites, any sensors connected directly to the power network lose both power and communication capabilities until such a time that power grid is restored. In a power grid embodiment, there can be a serious public safety issues while power is partially or totally offline. Additionally, power grid metrics today suffer from fragmentation issues due to the large number of individual power companies, delays in detection reporting times, and the lack of intelligence with secondary power within the collection framework.

SUMMARY

The described techniques relate to improved methods, systems, devices, and apparatuses that support distributed, secure, power grid data collection, consensual voting analysis, and situational awareness and anomaly detection. Generally, the described techniques provide for a system of broadly distributed, secure, cloud-supported and communications-equipped sensors connected to a power grid or other network. These sensors may be coupled with a communications network different than the power grid network and may be configured to report, via the communications network, data (e.g., measurements taken by the sensor) to a central processing application. The central processing application may process, analyze, and monitor the data over time. For example, the central processing application may determine a normalized range for a metric indicated by the data based on a first set of data received from a set of the sensors. The central processing application may compare new data received from the sensors to the normalized range and generate data indicating a relationship between the new data and the normalized range. For example, the centralized processing application may determine a consensus value of the new data. In another example, the centralized processing application may rank the new data according to a difference between the values of the new data and the normalized range. Thus, the central processing application may determine a sensor (e.g., associated with the new data) that is most out of range. Additionally or alternatively, the central processing application may detect and interpret anomalies at various geographies (including regional national, and international levels, and with multiple utilities).

A method is described. The method may include receiving, via a communications network from a set of network nodes of the communications network, a first set of data indicating a metric associated with a power grid, the communications network configured to provide a communication service to end devices at locations serviced by the power grid, where the set of network nodes use the power grid as a primary source of power, determining a normalized range for the metric associated with the power grid based on the first set of data, receiving, via the communications network from the set of network nodes of the communications network, a second set of data indicating the metric associated with the power grid, and generating a third set of data indicating a relationship between the second set of data and the normalized range for the metric.

An apparatus is described. The apparatus may include a processor, memory in electronic communication with the processor, and instructions stored in the memory. The instructions may be executable by the processor to cause the apparatus to receive, via a communications network from a set of network nodes of the communications network, a first set of data indicating a metric associated with a power grid, the communications network configured to provide a communication service to end devices at locations serviced by the power grid, where the set of network nodes use the power grid as a primary source of power, determine a normalized range for the metric associated with the power grid based on the first set of data, receive, via the communications network from the set of network nodes of the communications network, a second set of data indicating the metric associated with the power grid, and generate a third set of data indicating a relationship between the second set of data and the normalized range for the metric.

Another apparatus is described. The apparatus may include means for receiving, via a communications network from a set of network nodes of the communications network, a first set of data indicating a metric associated with a power grid, the communications network configured to provide a communication service to end devices at locations serviced by the power grid, where the set of network nodes use the power grid as a primary source of power, means for determining a normalized range for the metric associated with the power grid based on the first set of data, means for receiving, via the communications network from the set of network nodes of the communications network, a second set of data indicating the metric associated with the power grid, and means for generating a third set of data indicating a relationship between the second set of data and the normalized range for the metric.

A non-transitory computer-readable medium storing code is described. The code may include instructions executable by a processor to receive, via a communications network from a set of network nodes of the communications network, a first set of data indicating a metric associated with a power grid, the communications network configured to provide a communication service to end devices at locations serviced by the power grid, where the set of network nodes use the power grid as a primary source of power, determine a normalized range for the metric associated with the power grid based on the first set of data, receive, via the communications network from the set of network nodes of the communications network, a second set of data indicating the metric associated with the power grid, and generate a third set of data indicating a relationship between the second set of data and the normalized range for the metric.

Some examples of the method, apparatuses, and non-transitory computer-readable medium described herein may further include operations, features, means, or instructions for identifying a fourth set of data including an ordering, for each of the set of network nodes, of a set of quantized values according to values determined from the second set of data corresponding to the each of the set of network nodes, and determining a consensus value from the ordered sets of quantized values associated with the set of network nodes, where the third set of data includes the consensus value.

In some examples of the method, apparatuses, and non-transitory computer-readable medium described herein, the values determined from the second set of data include differences between the second set of data and the normalized range for the metric.

In some cases of the method, apparatuses, and non-transitory computer-readable medium described herein, determining the consensus value may include operations, features, means, or instructions for weighting one or more of the quantized values of the ordered set of quantized values for one or more of the set of network nodes based on a function of respective values of the second set of data for the one or more of the set of network nodes, a function of a difference between the ordered set of quantized values for a previous determination of the consensus value and the previously determined consensus value, an amount of traffic communicated via the one or more of the set of network nodes, a connectivity metric for the one or more of the set of network nodes, a relative network impact of unavailability of the one or more of the set of network nodes, or a combination thereof.

In some instances of the method, apparatuses, and non-transitory computer-readable medium described herein, identifying the fourth set of data may include operations, features, means, or instructions for identifying the set of quantized values for the metric associated with the power grid, and ordering the set of quantized values for each of the set of network nodes according to the values of the third set of data to generate the fourth set of data.

In some examples of the method, apparatuses, and non-transitory computer-readable medium described herein, the second set of data received from the set of network nodes includes the fourth set of data.

Some cases of the method, apparatuses, and non-transitory computer-readable medium described herein may further include operations, features, means, or instructions for triggering an alert based on determining that the consensus value satisfies a threshold.

Some instances of the method, apparatuses, and non-transitory computer-readable medium described herein may further include operations, features, means, or instructions for receiving, via the communications network from the set of network nodes of the communications network, a fourth set of data indicating a second metric associated with the power grid different than the first metric associated with the power grid, and ranking the second set of data and the fourth set of data based on a magnitude of a difference between respective values of the second set of data and the fourth set of data and respective normalized ranges of the first metric and the second metric, where the third set of data may be based on the ranking.

In some examples of the method, apparatuses, and non-transitory computer-readable medium described herein, generating the third set of data may include operations, features, means, or instructions for accumulating the rankings of the second set of data and the fourth set of data.

In some cases of the method, apparatuses, and non-transitory computer-readable medium described herein, generating the third set of data may include operations, features, means, or instructions for weighting the rankings of the second set of data and the fourth set of data.

In some instances of the method, apparatuses, and non-transitory computer-readable medium described herein, the weighting may be based on a function of respective values of the rankings of the second set of data and the fourth set of data, a function of a difference between the second set of data and the fourth set of data and normalized ranges for the first metric and the second metric, an amount of traffic communicated via respective network nodes of the set of network nodes, a connectivity metric for respective network nodes the set of network nodes, a relative network impact of unavailability of respective network nodes of the set of network nodes, or a combination thereof.

Some examples of the method, apparatuses, and non-transitory computer-readable medium described herein may further include operations, features, means, or instructions for receiving a request for the third set of data associated with a geographical region including a subset of the set of network nodes from a third party, determining the third set of data for the geographical region based on the second set of data for the subset of the set of network nodes, and communicating the third set of data for the geographical region to the third party.

In some cases of the method, apparatuses, and non-transitory computer-readable medium described herein, determining the third set of data for the geographical region may include operations, features, means, or instructions for determining the third set of data based on the second set of data for the subset of the set of network nodes and at least one network node of the set of network nodes not within the subset of the set of network nodes.

In some instances of the method, apparatuses, and non-transitory computer-readable medium described herein, determining the third set of data for the geographical region may include operations, features, means, or instructions for weighting values determined from the second set of data for the subset of the set of network nodes and the at least one network node based on locations of the subset of the set of network nodes and the at least one network node relative to the geographical region.

In some examples of the method, apparatuses, and non-transitory computer-readable medium described herein, the set of network nodes may be coupled with respective secondary power sources separate from the power grid.

In some cases of the method, apparatuses, and non-transitory computer-readable medium described herein, the metric associated with the power grid corresponds to a voltage, a current, a phase, a phase jitter, or a frequency.

In some instances of the method, apparatuses, and non-transitory computer-readable medium described herein, the set of network nodes include head-ends for fiber communication links of the communications network.

Figure 1:
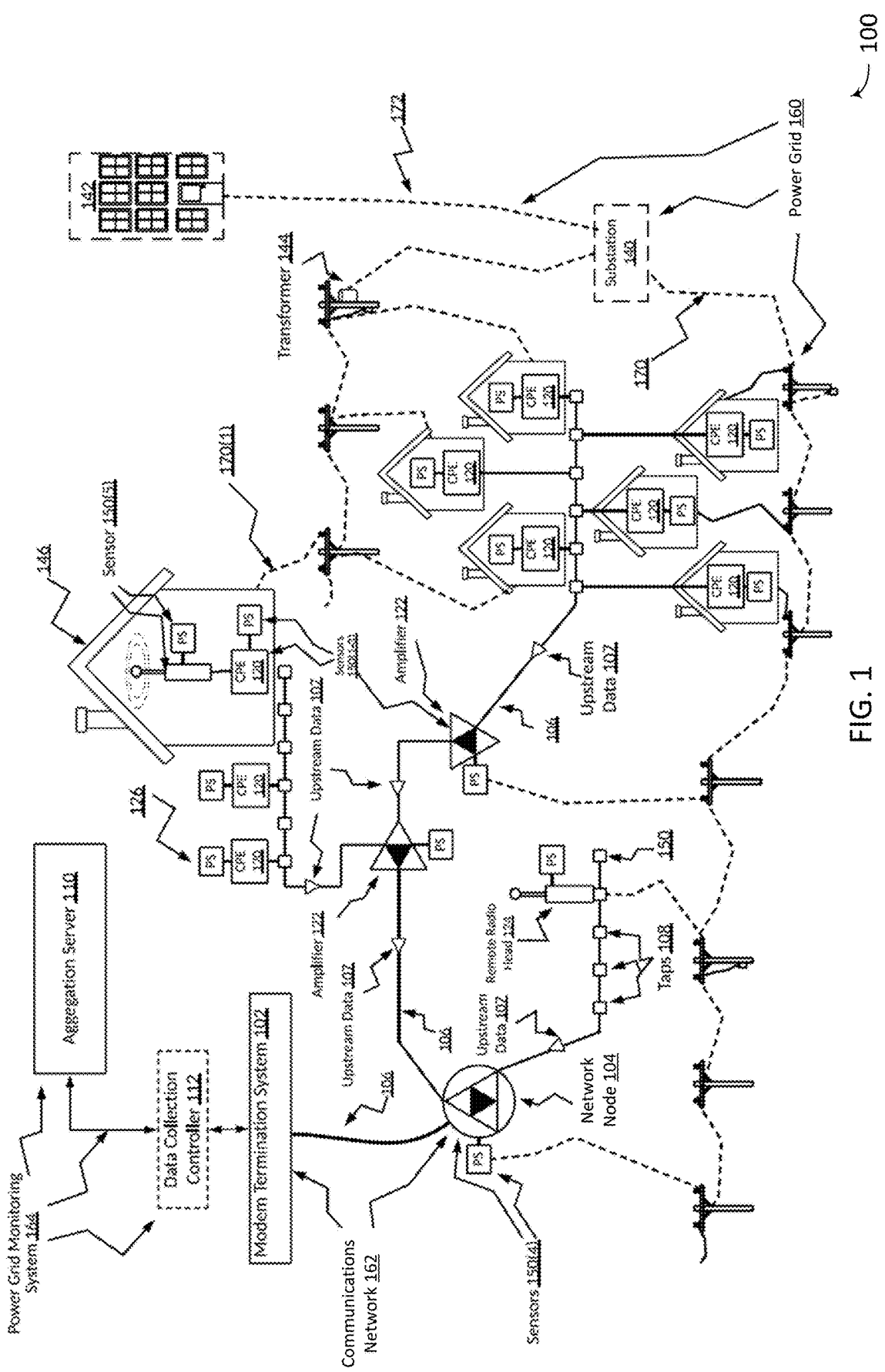
FIG. 1 through 3 illustrate examples of a system that support distributed, secure, power grid data collection, consensual voting analysis, and situational awareness and anomaly detection in accordance with aspects of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

The present systems and methods herein advantageously utilize an adjacent, optionally secure, and alternatively powered communications network to collect data metrics and/or record the status of, for example, a power grid or other systems(s) and/or network(s). For example, a communications network may be adjacent to the power grid and may be coupled with a set of sensors that are configured to collect data metrics of the power grid. The present systems and methods may be implemented to augment or, in some circumstances, replace conventional data metrics and power monitoring practices at a more reliable and granular level. Conventional systems may include costly dedicated power monitoring units with mobile wireless connections (e.g., LTE, 3G, satellite etc.) at substations (which typically serve about 1000 homes) or attached to specific meters which must be collected manually through near-field wireless technologies (e.g., NFC, Bluetooth, etc.). The adjacent, optionally secure communications network described and illustrated herein may include, for example, an adjacent communications network having communications service nodes (typically serving 1-500 homes) configured as a data metrics system for monitoring and optionally analyzing a network, such as but not limited to one or more power grids. The communications service nodes may be supported by a secondary power source (e.g., may receive primary power from the power grid and secondary or backup power from a secondary power source). For ease of explanation, the following description references broadband communication network(s) or a fiber communications network as exemplary embodiments of the communication network, which is configured with a secondary power capability. A person of ordinary skill in the art, upon reading and comprehending the present description and associated illustrations, will understand that other examples of communications network technologies may be implemented according to the novel and advantageous principles herein.

The communications network may include a set of network nodes (e.g., communications service nodes). For example, the communications network may be a fiber communications network including network nodes. The network nodes may be coupled with a head-end for the fiber communications network by a communication line (e.g., Wireless local area, coaxial cable, fiber-optic cable). The network nodes may also be coupled with the power grid. That is, the network nodes may receive and use the power grid as a primary power source. Each network node may include one or more sensors configured to measure a metric associated with the power grid. The communications network may communicate data collected by the sensors to a central processing application. The central processing application may determine a normalized range for the metric based on the data collected from the set of sensors. The communications network may communicate new sets of data (e.g., indicating values of the metric collected by the set of sensors) to the central processing application. The central processing application may compare the new sets of data to the normalized range and generate data indicating a relationship between the new data and the normalized range. For example, the central processing application may generate data indicating a consensus value of the new data. In another example, the central processing application may identify a sensor providing data that is most out of range (e.g., most different than the normalized range). Additionally or alternatively, the central processing application may perform geographical or group analysis of values from one type of sensor. For example, the central processing application may determine a most out of range sensor for a geographical region.

The embodiments described herein are particularly useful for reliable collection and analysis of power grid network metrics on a geographic scale beyond the broad coverage of any individual electricity provider's network, for example. There are numerous power utility companies that serve a small portion of the entire energy market. This results in fragmented data from one or more small utility companies that each cover a portion of a geographic area. Collection and analysis of data metrics of a power grid across more traditional geographies and markets such as neighborhoods, cities, regions, states, territories, nations, or other geographies may improve data metric analysis of the power grid. An aggregated data source or scale adjustable data source may enable valuable monitoring and analysis. For example, key analyses on network and infrastructure security on nationwide or global scale may be possible with a comprehensive data stream that spans multiple utility markets in order to analyze broader trends, outages, or anomalies.

Some exemplary embodiments described herein provide systems and methods for monitoring and maintaining a backup or alternative stream of data at a greater detail than is currently achievable with low resolution power grid substation data. In one embodiment of invention herein each monitoring sensor covers a much smaller geographic area, typically only 1-500 homes depending on the architecture of the deployment of the out-of-band or adjacent network. In these embodiments an alternative data stream may be leveraged to protect, for example, first responders, network technicians, etc. by providing a high quality, detailed/granular, alternatively powered, communicatively coupled out-of-band picture/data of a power grid's status via a variety of possible metrics (including, but not limited to, voltage, current, frequency, direction of electricity flow, quality of the electricity, voltage/current variance, etc.) during normal activity or outage or brown out events providing critically improved situational awareness to, for example first responders, emergency personnel, maintenance personnel, administrators, etc. Nevertheless, a person of ordinary skill in the art will understand, upon reading and comprehending the present application, how the systems and methods described herein apply to other fields (e.g., first responders, commercial or residential insurance, smart contracts, power generation siting, power transaction markets, etc.) where tracking the status and metrics of a network (such as a power grid) through an adjacent communications network with independent/secondary power is valuable.

In some instances, the data collected in real-time can also be securely stored in an aggregation and processing server(s) or, alternatively, in other secure storage, in order to construct a historic dataset. Such a dataset enables analysis and could be leveraged for a variety of uses including, but not limited to, power quality metrics over time, restoration and recovery prediction capabilities, or other analysis. In one exemplary embodiment a historical dataset and quality analysis is used to improve insurance policy writing inputs and improve overall cost prediction in a variety of scenarios where the power grid is an integral factor.

The highly granular nature of sensor data combined with in-network machine learning enables a system with significant event (e.g., outage, cybersecurity breach, etc.) prediction capabilities due to the significant amount of raw data input in real-time and historically. Further enabling the predictive processing value and monitoring applications is the agnostic platform nature of the adjacent communications network and back-up power. While power grid equipment can easily monitor characteristics of electricity (e.g., voltage, current, resistance), because of its modular upgradability and underlying out-of-band communications and power supplies, equipment on a communications network can be easily configured to monitor an extremely wide range of network, environmental, atmospheric, and other conditions, even when power on the power grid is unreliable. This flexibility of data input coupled with unconfined geospatial boundaries enables next-generation monitoring, analysis, and prediction for critical infrastructure, such as power grids.

Aspects of the disclosure are initially described in the context of systems. Aspects of the disclosure are further illustrated by and described with reference to a flowchart, a system, an aggregate sensor data visualization, and process flows that relate to distributed, secure, power grid data collection, consensual voting analysis, and situational awareness and anomaly detection.

FIG. 1 illustrates an example of a system 100 that supports distributed, secure, power grid data collection, consensual voting analysis, and situational awareness and anomaly detection in accordance with aspects of the present disclosure. System 100 may include a communications network 162 that is adjacent to a power grid 160. The communications network 162 may be coupled with a set of sensors 150 (distributed data collection elements). The sensors 150 may collect data related to a metric of the power grid 160. The communications network 162 may communicate the data to the aggregation server 110 by the modem termination system 102 and the data collection controller 112. This may enable the power grid monitoring system 164 to collect substantially real-time metrics (e.g., multiple readings on a per second or sub-minute basis) and/or interval data (e.g., 1-minute, 5-minute, or hourly readings).

Power grid 160 is shown to include a generation station 142 connected through a network of transmission power lines 172 to a substation 140. Substation 140 is connected with a network of distribution power lines 170 to a series of transformers 144 connected together by power lines 170. Distribution power lines 170(1) connect the power grid to end devices of power users, such as residential homes 146.

Communication network 162 is shown to include a modem termination system 102, a network node 104 (although more network nodes may be included), amplifiers 122 linked through communications lines 106 (such as DSL, coaxial cable, fiber optic cable, wireless links, etc.), and taps 108. An exemplary communications network 162 typically includes a head-end (not shown) connected with one or more modem termination system(s) 102. Taps 108 are in communication with communications network delivery technologies, such as remote radio heads 124 (such as a Wi-Fi access point, a small cell or a microcell or similar, etc.) or a customer premise equipment (CPE) 120 (e.g., a modem, a laptop, a smart phone, a tablet, a smart TV, small cell (or similar), or similar networking devices).

Power grid monitoring system 164 is shown to include an aggregation server or servers 110 (also understood as sensor data processing elements) connected, directly or indirectly, with a modem termination system 102. Aggregation server 110 may optionally be connected with a modem termination system 102 directly or through an intermediary data collection controller 112.

In an embodiment, the communications network 162 may be coupled with power supplies (PS) 126 that supply primary electrical power to network components (such as network nodes 104, some versions of taps 108, amplifiers 122, or CPE 120) throughout a communications network 162. PS 126 may condition, received conditioned power, or be directly or indirectly coupled to a power conditioning element (not shown). Upstream data 107 related to the power/electricity quality or power/electricity metrics of the power grid may be derived from the power conditioning elements, which are utilized to regulate and condition the power provided to communication network 162's active components, such as but not limited to amplifiers 122 and network nodes 104, see below for more details. The PSs 126 may couple the communications network 162 with the power grid 160. That is, the PSs 126 may condition or receive conditioned power via the power grid 160 and provide the conditioned power to the communications network 162 (e.g., supplying primary power to the network nodes 104).

Power grid monitoring system 164 is coupled with power grid 160 through an aggregation server 110 through the communications network 162. The power grid monitoring system 164 utilizes the aggregation server 110 to connect to a modem termination system 102 within the communications network 162. The communications network 162 may contain the plurality of PSs 126. For purposes of clarity, the PSs 126 are collectively also shown as sensors 150 in system 100 when utilized by the power grid monitoring system 164. However, in some cases, the sensors 150 may be distinct from the PSs 126. For example, the sensors 150 may be coupled with a network node 104 or included within the network node 104. For example, the sensors 150 may measure power as provided by the PSs 126 to the network nodes 104. In either case, the sensors 150 may be coupled with a PS 126. In some cases, one or more PSs 126 may include or be coupled with a secondary or backup power source. Thus, if the power grid 160 experiences a loss of power, the sensors 150 may still receive power (e.g., from the PSs 126) and may still be able to communicate data to the modem termination system 102.

Through its components and connections to the power grid 160 and communication network 162, power grid monitoring system 164 may monitor, for example, power grid metrics, such as but not limited to status (on/off), voltage, current, reflections, frequency, phase, resistance, etc. Power grid monitoring system 164, through its association to communication network 162, has an independent communication path for conveying recorded power grid 160 metrics. Power grid monitoring system 164 may also have an independent power supply (e.g., via PSs 126 that include or are coupled with a secondary power source) that provides electricity to at least power grid monitoring system 164 if power grid 160 loses capacity or has reduced or limited capacity. In such a situation power grid monitoring system 164 is capable of extended monitoring and communication regarding the status of power grid 160 even when power grid 160 does not provide electricity to power grid monitoring system 164 and communication network 162.

In some embodiments, the power grid monitoring system 164 of system 100 and aggregation server 110 may collect a variety of different power grid metrics simultaneously. In this example some sensors 150 collect real-time measurements while other sensors 150 within the same power grid monitoring system 164 collect interval power grid data at, for example, 1-hour intervals. The sensors 150 may be configured to collect data related to a metric such as a voltage, a current, a phase, a phase jitter, or a frequency associated with the power grid 160. Additionally or alternatively, the sensors 150 may be configured to collect data related to humidity, temperature, light, sound, particle or chemical readings. In some embodiments of power grid monitoring system 164 all sensors 150 may be deployed for a single purpose and collect identical types of data. In some other embodiments of the power grid monitoring system 164, a first portion of the sensors 150 may be configured to collect a first metric (e.g., voltage) while a second portion of the sensors 150 are configured to collect a second metric (e.g., current). In other implementations, aggregation server 110 aggregates and analyzes a combination of mixed sensor 150 types and transmission frequencies and pathways.

In one embodiment, sensors 150(1-5) may be part of communications network nodes and/or their power supplies 150(4), or customer network equipment and/or their power supplies attached to the power grid 150(1-3). In this embodiment modem termination systems 102, network amplifiers 150(1-3), remote radio heads 124, and/or taps 108 may be, act as or include all or a portion of sensors 150. Additionally, indoor or outdoor wireless communications equipment 150 (5) (e.g., small cells, femtocells, picocells, Wi-Fi access points, eNodeBs, gNodeBs, or similar devices) could be used. System 100 is illustrated as an exemplary architecture to implement the power grid monitoring system 164 according to various embodiments of the present disclosure. Other architectures are contemplated by the present inventors, which do not depart from the scope herein. Furthermore, for ease of explanation, redundant components that may be implemented within system 100 are not illustrated, nor are link-level objects or implementations, security authentication objects/sequences/implementations, or other components that may be conventionally utilized in a communications network for communication, availability, or security purposes.

In an exemplary embodiment of power grid monitoring system 164, sensor 150 readings (e.g., data sets indicating the detected value of a metric of the power grid 160) are sent directly or indirectly via the communications network 162 to an aggregation server 110, where it is processed. In some cases, the sensor 150 readings may be sent to the aggregation server 110 by an indirect communication link. For example, the sensor 150 readings may pass through a network node 104 first as shown by communication lines 106 or the modem termination system 102. In one embodiment, aggregation server 110 utilizes an optional data collection controller 112 to request and securely receive the sensor 150 readings from the power grid monitoring system 164 network. Alternatively, the upstream data 107 is sent to aggregation server 110, which may exist on the internet, where it is accumulated, processed, and analyzed.

Figure 2:
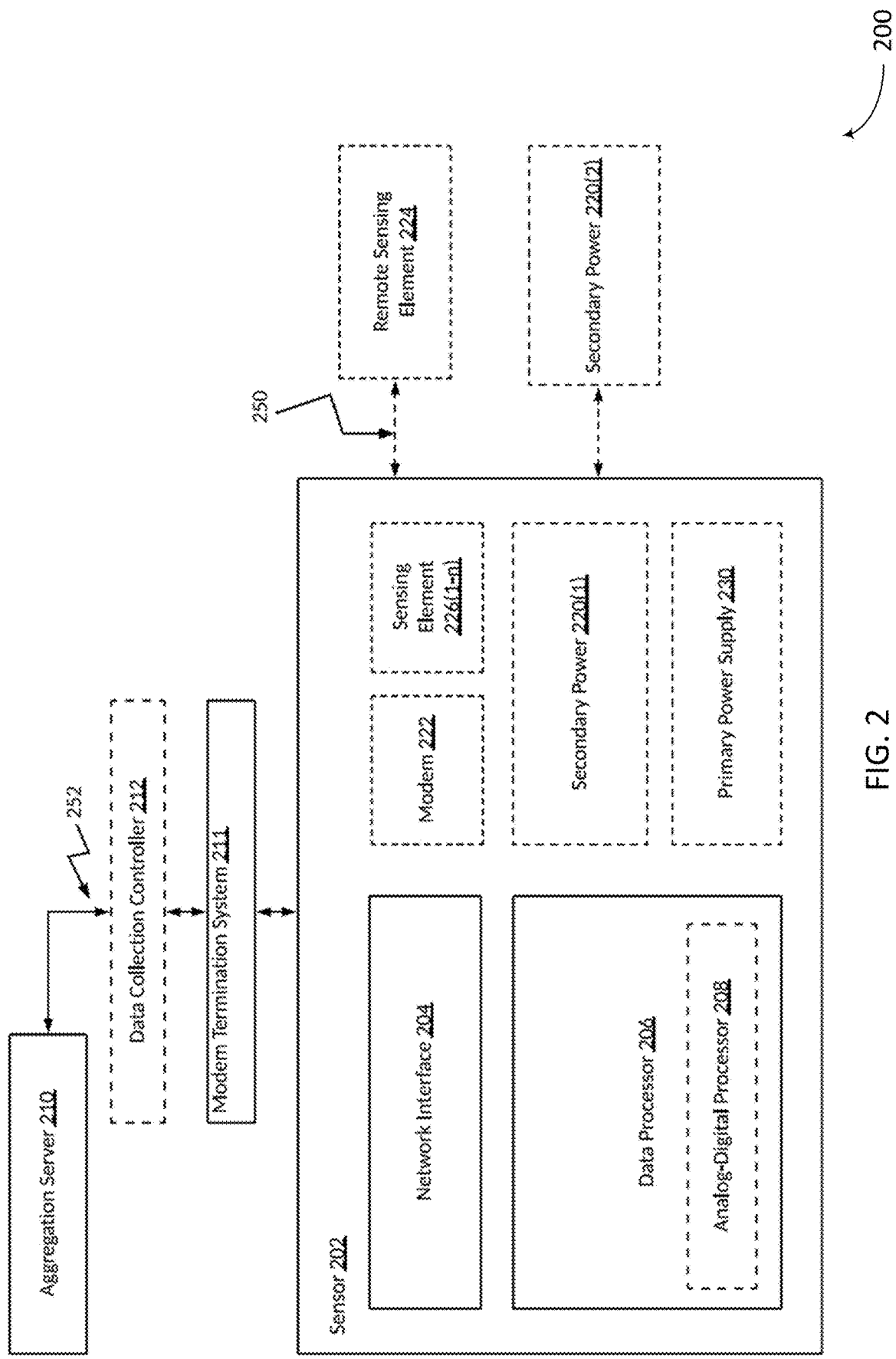

FIG. 2 illustrates an example of a system 200 that supports distributed, secure, power grid data collection, consensual voting analysis, and situational awareness and anomaly detection in accordance with aspects of the present disclosure. System 200 may include aspects described with reference to FIG. 1. For example, the aggregation server 210 may be an example of the aggregation server 110, the data collection controller 212 may be an example of the data collection controller 112, the modem termination system 211 may be an example of the modem termination system 102, and the sensor 202 may be an example of the sensors 150. The system 200 may further include a remote sensing element 224 and secondary power sources 220.

Sensor 202 may collect data indicating a metric associated with a power grid (e.g., the power grid 160 as described with reference to FIG. 1). For example, the sensor 202 may monitor a voltage, a current, a frequency, a phase, a phase jitter, a power quality, or a power associated with the power grid. For example, the sensor 202 may be coupled with a power line (e.g., a power line 170 as described with reference to FIG. 1). The sensor 202 is shown including a network interface 204, data processor 206, and optionally, a modem 222, sensing element(s) 226(1-n) (in which n can be 0 or any integer, representing a single or a plurality of different or the same sensors), secondary power 220(1), and primary power supply 230. The modem termination system 211 may be the same or similar to the modem termination system 102 of FIG. 1. The primary power supply 230 may be the same or similar to the power supply 126 of FIG. 1. Additionally, sensor 202 is optionally connected with external remote sensing element(s) 224 via a wired or wireless communications connection 250, and/or an external secondary power source 220(2).

Sensor 202 is shown connected to or otherwise in communication (directly or indirectly) with aggregation server 210 via modem termination system 211. Sensor 202 can be connected to aggregation server 210 directly, or, indirectly through a modem termination system 211. Optionally, sensor 202 is connected to or in direct or indirect communication with remote sensing element 224, secondary power 220(2), and data collection controller 212.

Non-limiting examples of secondary power sources 220 include but are not limited to a battery, uninterruptible power supply (UPS), and/or an energy generation component such as a solar panel, wind turbine, or backup generator. In one exemplary embodiment of system 200, a sensor 202 (which may be the same or similar to sensor 150 in system 100 of FIG. 1) is connected to an aggregation server 210 (which, may be the same or similar to aggregation server 110 as shown in system 100 of FIG. 1) through a wired or wireless communications channel.

In one or more embodiments, an aggregation server 210 is securely connected with sensor(s) 202. Such an association enables secure data transmission of raw sensor data collected at the modem 222, power supply 230, remote sensing element 224, or other sensing elements 226(1-n), in which n can be 0 or any integer. A network interface 204 and data processor 206 are utilized within sensor 202 to process, receive, transmit, and interact with sensing elements 226(1-n), remote sensing element 224, power supply 230, or modem 222.

In further operation, system 200 may utilize a network interface 204 to communicate directly with an aggregation server 210, or through intermediary network elements (not pictured). Optionally, sensor 202 employs a data collection controller 212 to coordinate data requests and deliveries from sensor 202 to an aggregation server 210. In one exemplary embodiment the data collection controller 212 or aggregation server 210 may use secure data transmission (e.g., simple network management protocol). Data collection can occur within or remotely to sensor 202 either directly through internal sensing elements 226(1-n) or other internal or external components such as an optional modem 222, primary power supply 230, or other means. In some embodiments of system 200 data collection may take place remotely from sensor 202 using external remote sensing element(s) 224 and through either wired or wireless connection 250 to sensor 202. Additionally, a data processor 206 may use an analog to digital processor 208 to convert analog signals received into digital ones for re-transmission to aggregation server 210.

Figure 3:
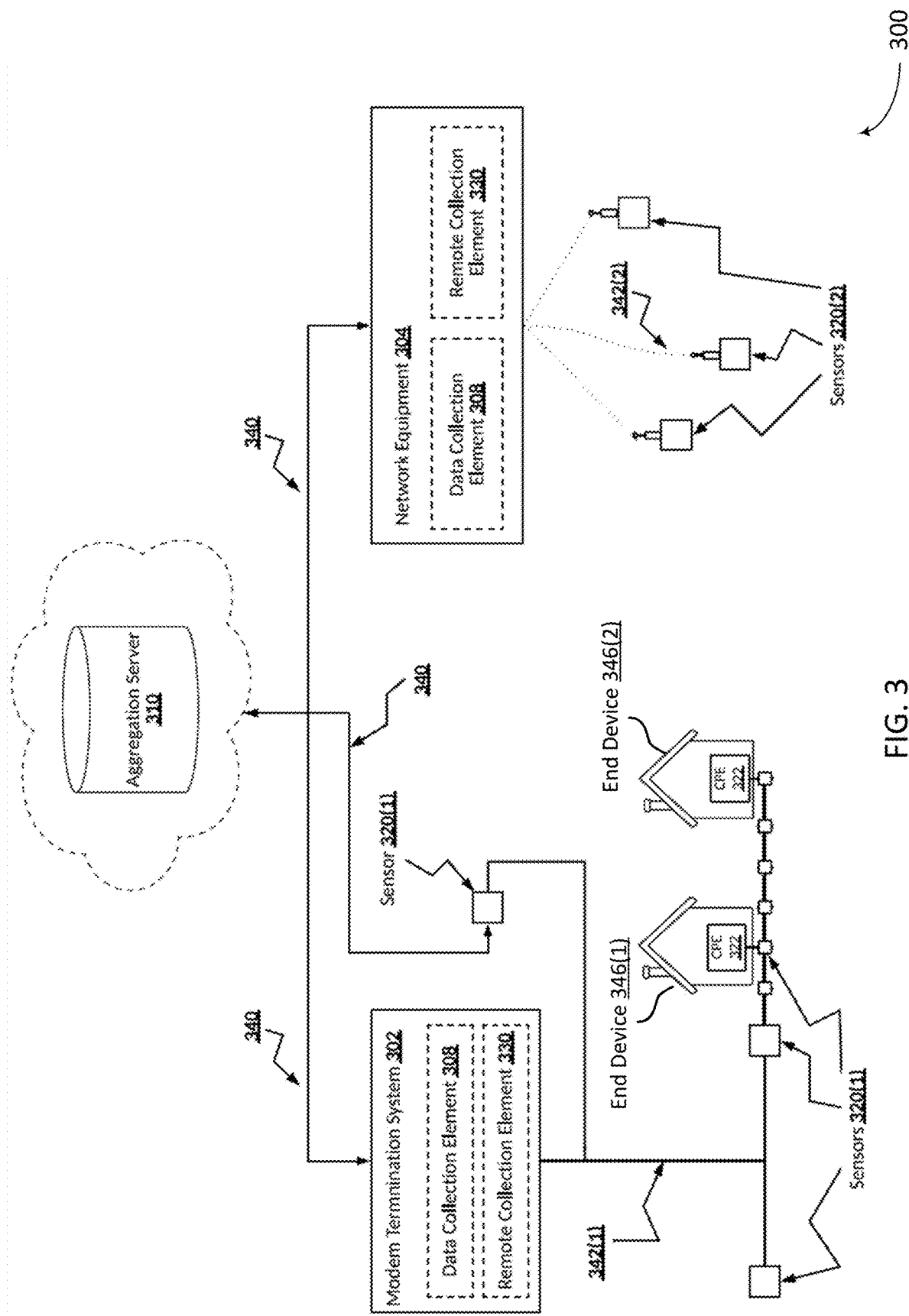

FIG. 3 illustrates an example of a system 300 that supports distributed, secure, power grid data collection, consensual voting analysis, and situational awareness and anomaly detection in accordance with aspects of the present disclosure. FIG. 3 may include aspects described with reference to FIGS. 1 and 2. For example, system 300 may be an example of a power grid monitoring system as described with reference to FIG. 1. Additionally, the aggregation server 310 may be an example of the aggregation servers as described with reference to FIGS. 1 and 2, the modem termination system 302 may be an example of the modem termination systems as described with reference to FIGS. 1 and 2, the sensors 320 may be examples of the sensors as described with reference to FIGS. 1 and 2, the end devices 346 may include CPE (322) or aspects of residential homes as described with reference to FIG. 1, and the network equipment 304 may be an example of a network node 104 as described with reference to FIG. 1. In some cases, the modem termination system 302 may be an example of a network node. Additionally or alternatively, the modem termination system 302 may be an example of a head-end for a communications network (e.g., including the network equipment 304 and the connections 340).

Aggregation server 310 is shown in connection to or otherwise in communication (directly or indirectly) with modem termination system(s) 302, sensor(s) 320(1), and/or network equipment 304 through communications connections 340. Communication connection 340 may be wired (e.g., DSL, coaxial cable, fiber optic cables, etc.) or wireless (e.g., LTE, 3G, satellite, Wi-Fi, etc.). A modem termination system 302 or network equipment 304 is further shown in connection with sensors 320(1-2) through connections 342 (1-2). Communications connections 342(1-2) may be wired (e.g., DSL, coaxial cable, fiber optic cables, etc.) or wireless (e.g., LTE, 3G, satellite, Wi-Fi, etc.).

In a non-limiting exemplary network configuration shown in system 300, an aggregation server 310 is optionally located on cloud-based computing servers, and is configured to collect power grid metrics from one or more sensors 320(1-2). The aggregation server 310 securely stores, processes and analyzes a power grid network (e.g. power grid 160 of FIG. 1) via a communications network (e.g., communications network 162 of FIG. 1). For example, each sensor 320 may monitor a metric associated with a power grid. The sensors 320 may communicate, by the connections 342 and/or 340 (e.g., by the communications network), data indicating the metric to the aggregation server 310. The aggregation server 310 may determine a normalized range for the metric based on the data collected from the sensors 320. After the aggregation server 310 determines the normalized range, the sensors 320 may communicate new data to the aggregation server 310. The aggregation server 310 may compare the new sets of data to the normalized range and generate data indicating a relationship between the new data and the normalized range. For example, the aggregation server 310 may generate data indicating a consensus value of the new data. In another example, the aggregation server 310 may identify a sensor 320 providing data that is most out of range (e.g., most different than the normalized range). Additionally or alternatively, the aggregation server 310 may perform geographical or group analysis of values from one type of sensor 320. For example, the aggregation server 310 may determine a most out of range sensor 320 for a geographical region.

In one embodiment of system 300, a modem termination system 302, other network equipment 304, or sensors 320 (1-2) are connected to an aggregation server 310 through secure communications connections 340. Each of these network components may optionally include a data collection element 308 or remote collection elements 330 (some not pictured). Sensors 320(1-2) may be the same or different embodiments as sensors 202 in system 200 and 150 in system 100. Additionally, sensors 320(1-2) may be contained within or connected to customer premise equipment (CPE) 322 in some embodiments.

In the exemplary embodiment of a data collection network shown in system 300, an aggregation server 310 utilizes secure communications connections 340 to request and receive sensor 320(1-2) data. Such sensor data may be sent back to the aggregation server 310 on either a time interval or real-time basis. Exemplary secure channel configurations may include virtual private networks (VPNs), traffic tunnels, HTTP/S, or alternative similar secure network communication means deployable over communications connections 340. Alternatively, an aggregation server 310 may communicate indirectly with sensors 320(1-2) through a modem termination system 302 or other network equipment 304. Remote sensors 320(2) may be deployed for additional monitoring uses which in some embodiments include additional metrics such as temperature, noise, humidity etc. In such embodiments, an optional remote collection element 330 is configured to receive wireless data communications 342(2) from remote sensors 320(2) using wireless protocols such as LTE, 3G, satellite, Wi-Fi, Bluetooth, Zigbee, etc.

Figure 4:
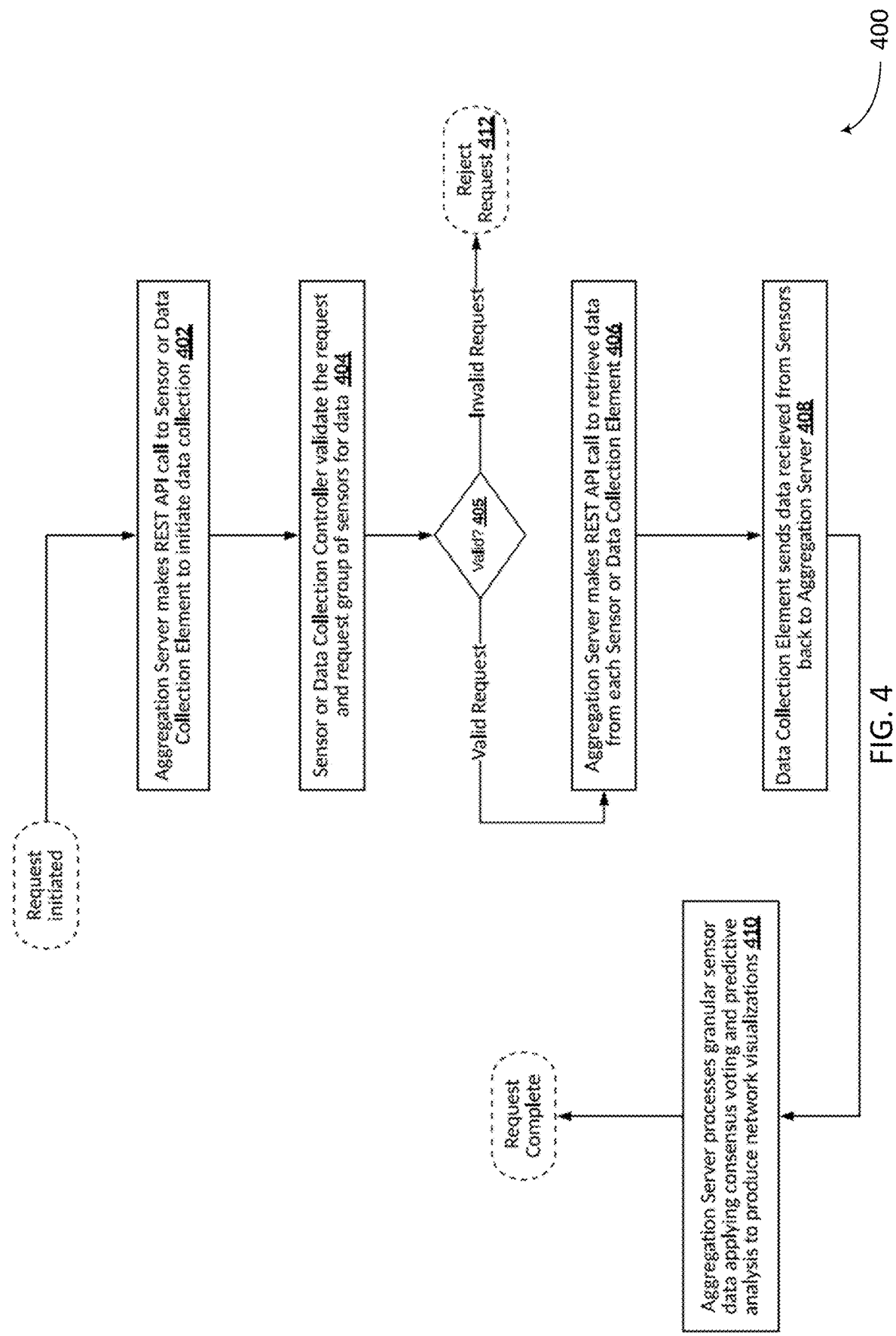
FIG. 4 illustrates an example of a flowchart that supports system and method for distributed, secure, power grid data collection, consensual voting analysis, and situational awareness and anomaly detection in accordance with aspects of the present disclosure.

FIG. 4 illustrates an example of a flowchart 400 that supports a method for distributed, secure, power grid data collection, consensual voting analysis, and situational awareness and anomaly detection in accordance with aspects of the present disclosure. FIG. 4 may illustrate an exemplary method that an aggregation server (e.g., as described with reference to FIGS. 1 through 3) may use to complete a secure push or pull data request 430 to individual or groups of sensors (e.g., as described with reference to FIGS. 1 through 3). The data request can collect real-time or time interval metrics, or both. In one exemplary method, power grid metrics (such as status, voltage, current, resistance, etc.) are sent to an aggregation server via data request 430.

The method illustrated by flowchart 400 includes a request initiation step 402, a request validation step 404 with optional rejection 412, a decision step 405, a retrieve call step 406, a send step 408, and a processing and analysis step 410.

The request may be initiated based on the aggregation server receiving a request (e.g., from a client device) for data relating to the power grid. For example, an electricity provider may issue a request to the aggregation server requesting data related to the power grid. In another example, the request may be initiated based on a predefined periodicity (e.g., every day, every week, every month). For example, the aggregation server may initiate a request every 24 hours. In some cases, the request may indicate a certain metric (e.g., a voltage, a current, a frequency, a phase, a phase jitter, a power quality, or a power factor) associated with the power grid. Additionally or alternatively, the request may indicate a geographical region. For example, the request may include a request for a metric associated with the power grid within a certain geographical region.

In step 402 an aggregation server makes a call to a sensor or a sensor's optional internal data collection element(s). One example of step 402 is aggregation server 310, 210, 110 sending a first application program interface (API) call to a sensor for data.

In method step 404 a sensor receives the request via a channel (e.g., HTTP/S or other similar communication protocol or secure communication protocol) and validates the request. In decision step 405 if valid, the sensor then makes a request to any other sensor(s) downstream or internal sensing elements. If the request is invalidated the request is rejected through optional step 412 and the aggregation server is notified. Valid data requests to sensor(s) are made through a secure data collection channel (e.g., simple network management protocol or similar secure protocol). One example of method step 404 is sensor 320, 202, 150 receiving a request from server 310, 210, 110 via a secure channel or communication protocol.

In method step 406 the aggregation server retrieve data collected from each validated data collection element. One example of step 406 is aggregation server 310, 210, 110, receiving data from sensor 320, 202, 150. In some cases, the request may request data indicating a certain metric associated with the power grid. Here, the aggregation server may receive data from sensors configured to measure the requested metric. In some other cases, the request may request data indicating more than one metric. Here, the aggregation server may receive data from multiple types of sensors (e.g., sensors configured to measure voltage, current, frequency, phase, phase jitter, power quality, or power factor).

In step 408 the data collection element(s) sensor data received from sensors is sent back to the aggregation server via a secure channel, completing that data request cycle. In some embodiments the exemplary data request cycles shown in method 400 could occur at a variety of intervals, from sub-second requests to daily ones.

In step 410 sensor data is received from the collection element in the aggregation server where it is processed. For example, the aggregation server may apply granular-level consensus voting and predictive machine learning analysis to construct network visualizations tailored for a variety of uses cases, such as power grid monitoring, outage management and mitigation, power and communications network restoration estimates, adjacent network confirmation of network status, etc.

In some cases, the power grid monitoring may include the aggregation server receiving data from the sensors and processing the data. For example, the aggregation server may receive, from a set of sensors, a first set of data indicating a metric associated with a power grid by a communications network (e.g., a fiber communications network). The aggregation server may determine a normalized range for the metric based on the first set of data. For example, the aggregation server may determine a consensus value of the metric based on the first set of data, where the normalized range is based on the consensus value of the metric. The aggregation server may subsequently receive, from the set of sensors, a second set of data indicating the metric by the communications network. The aggregation server may process the second set of data to generate a third set of data indicating a relationship between the second set of data and the normalized range.

The third set of data may indicate a sensor associated with a most out of range value of the metric. For example, the aggregation server may determine which value within the second set of data is most different than the consensus value indicated by the first set of data. The third set of data may indicate the sensor associated with the most out of range value. Additionally or alternatively, the third set of data may relate to geographical or group analysis of values from one type of sensor. For example, the aggregation server may determine a most out of range sensor for a geographical region.

Figure 5:
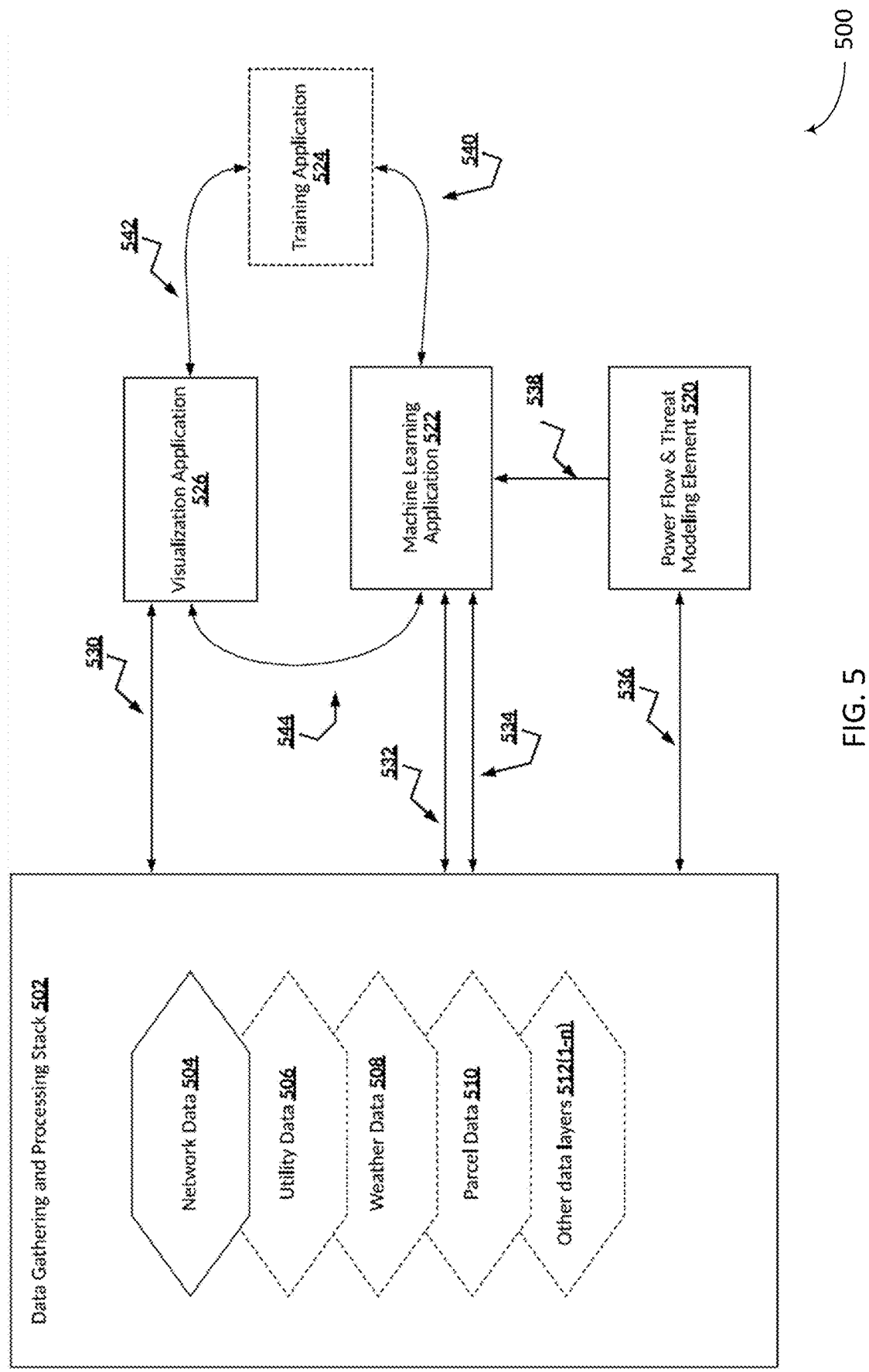
FIG. 5 illustrates an example of a system that supports distributed, secure, power grid data collection, consensual voting analysis, and situational awareness and anomaly detection in accordance with aspects of the present disclosure.

FIG. 5 illustrates an example of a system 500 that supports distributed, secure, power grid data collection, consensual voting analysis, and situational awareness and anomaly detection in accordance with aspects of the present disclosure. FIG. 5 may include aspects described with reference to FIGS. 1 through 4. For example, the system 500 may be an example of a network data aggregation and processing system 500 that enables advanced situational awareness, prediction, and anomaly detection in a network. Here, the system 500 may collect data from sensors (e.g., as described with reference to FIGS. 1 through 4) by a communications network such as a fiber communications network. The data collected may be processed using a machine learning application 522 to improve anomaly and cybersecurity threat detection and visualization capabilities across an entire power grid. These capabilities may be irrespective of individual power company boundaries and may provide previously unavailable cross-boundary perspectives.

Data aggregation and processing system 500 is shown to include a data gathering and processing stack 502 that contains layers of geospatial data, including network data 504. Network data 504 may be the same or similar network data as collected through the power grid monitoring system 164 of FIG. 1, for example. The data gathering and processing stack 502 can optionally include additional other layers of geospatial data, such as utility data 506, weather data 508, parcel data 510, or other data layers 512(1-n), in which n can be 0 or any integer. Data aggregation and processing system 500 is shown to include a power flow and threat modelling element 520, a visualization application 526, a machine learning application 522, and, optionally, a training application 524.

Data aggregation and processing system stack ("data stack") 502 is coupled with a visualization application 526 via a real-time data communications channel 530, which delivers real-time data from the data stack 502 to the visualization application 526. The data stack 502 is further coupled with a power flow and threat modeling element 520 via communications channel 536 which delivers historical data into the power flow and threat modeling element 520. The power flow and threat modeling element 520 is connected with the machine learning application 522 via a communications channel 538. The machine learning application 522 is also directly coupled with the data stack 502 via communications channels 532 and 534 and receives both real-time and historical data from the data stack. The visualization application 526 and the machine learning application 522 are connected via communications channel 544 such that analysis in the machine learning application 522 can be visualized in the visualization application 526. The machine learning application 522 and visualization application 526 can, optionally, be connected through an intermediary training application 524 via communications channels 542 and 540. Communications channels 530, 532, 534, 536, 538, 540, 542, and 544 discussed herein are a means for secure data transfer, such as through a wired connection (e.g., Ethernet, DSL, coaxial cable, fiber optic cable, etc.), or through a wireless one (e.g., Bluetooth, Zigbee, LTE, 3G, satellite, Wi-Fi, etc.).

In one embodiment, a data gathering and processing stack 502 is utilized to aggregate communications network data layer 504 alongside any number of optional secondary data layers. While the complementary data layers needed will vary by application and analysis requirements, some examples of commonly utilized data layers would be utility data 506, weather data 508, and/or parcel data 510. Additionally, other data layers 512(1-n) may be included in the data gathering and processing stack 502 as required by a specific application (n may be 1 or any integer). In this exemplary embodiment the data gathering and processing stack 502 is configured to produce geospatial data visualizations through a visualization application 526. In this or other embodiments, the data processing and intelligence system 500 can be configured to deliver real-time power flow and threat modelling through a power flow and threat modelling element 520. In any such embodiment a machine learning application 522 with optional training application 524 may be utilized to increase accuracy and efficiency of the visualization application 526 or power flow and/or threat modelling element 520.

In this exemplary embodiment the data gathering and processing stack 502 delivers real-time sensor data to the visualization application 526 which utilizes said sensor data to produce visualizations based on specific application requirements (e.g., sensor mapping, voltage over time, power outages, etc.). Additionally, the visualization application 526 can be configured to utilize a machine learning application 522 to improve the quality of data used in the visualizations. The machine learning application 522 receives data from the data stack 502 and applies machine learning algorithms to increase predictive capabilities. One example of which would be anticipating power outages through historical trends implying a correlation between weather events and power outages. This machine processed and classified data is returned to the visualization application 526. Optionally, the machine learning application 522 may use an intermediary training application 524 to take real-time data observations from the visualization application and apply training intelligence to the observed data. In this example, annotated data is then fed into the machine learning application 522 to improve predictive abilities and accuracy. One example of a training application 524 would be adding a human 'trainer' to the system to annotate data and correct the machine learning application 522 and improve classification. In one embodiment the power flow and threat modelling element 520 receives historical data from the data processing and gathering stack 502 which is utilized to create cybersecurity or national security threat models. These models can be used to identify and/or anticipate attacks, false-alarms, outages, or other non-regular events on the network (e.g., power grid). Threat models can further, in some embodiments, be delivered to the machine learning application 522 via communications channel 538 to add an additional training mechanism.

Figure 6:
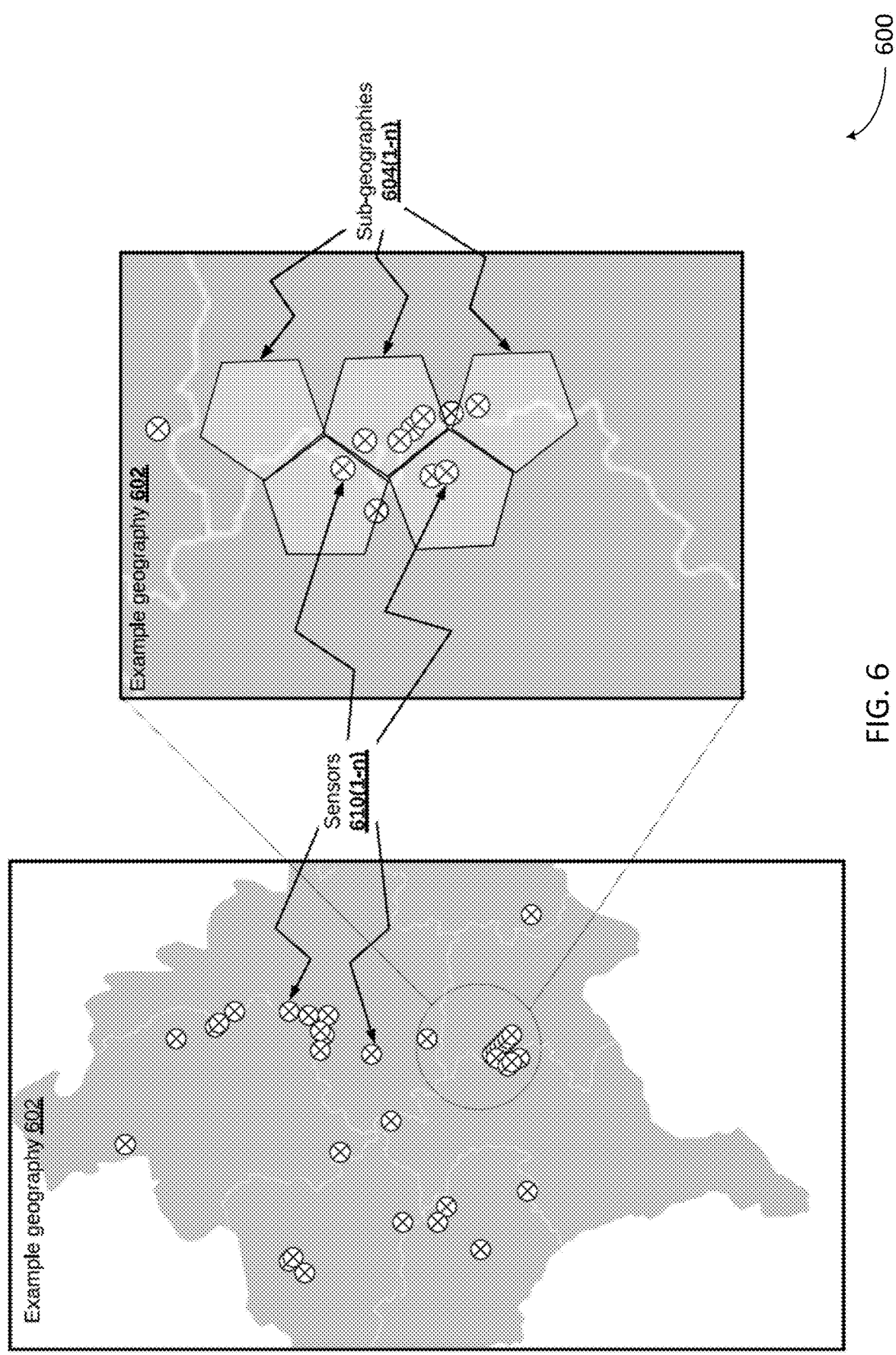
FIG. 6 illustrates an example of an aggregate sensor data visualization that supports distributed, secure, power grid data collection, consensual voting analysis, and situational awareness and anomaly detection in accordance with aspects of the present disclosure.

FIG. 6 illustrates an example of an aggregate sensor data visualization 600 that supports distributed, secure, power grid data collection, consensual voting analysis, and situational awareness and anomaly detection in accordance with aspects of the present disclosure. FIG. 6 may illustrate an aggregate sensor data visualization 600 across a geographically distributed sensor network using an example consensual voting implementation. Geography 602 may have a plurality of sensors 610(1-$n$) (in which n may be 0 or any integer) located throughout the geography 602. FIG. 6 may include aspects described with reference to FIGS. 1 through 6. For example, the sensors 610 may be examples of the sensors as described with reference to FIGS. 1 through 5. The aggregate sensor data visualization 600 may employ a new method of consensus voting amongst the sensors 610 (1-$n$) to determine consensus among a sub-geography 604 or cluster 604(1-$n$)(in which n may be 0 or any integer).

In some cases, each of the sensors 610(1-$n$) may be configured to monitor a metric associated with a power grid within the geography 602. The sensors 610(1-$n$) may be coupled with network nodes (e.g., as described with reference to FIGS. 1 and 2). The network nodes may communicate the data collected by the sensors 610(1-$n$) to an aggregation server. The aggregation server may perform data processing to generate data indicating normalized ranges, consensus outliers, or a relationship between the collected data and a normalized range associated with the data. In some cases, the data indicating the relationship between the collected data and the normalized range may be based on a consensus reading of the sensors 610(1-$n$) within the geography 602, within the sub-geography 604, or proximate to the sub-geography 604.

In existing large sensor datasets, there are a number of ways that one can perform sensor fusion so as to obtain a consensus reading of the sensors in a given area. For example, a consensus reading may be obtained by taking an average. That is, the value of the metric indicated by each sensor may be averaged. But averaging the data may suffer from the fact that unless the variance in readings is small, the average may wash out particular sensors with problematic readings. Alternatively, a consensus reading may be obtained by taking the majority vote of binary readings (e.g., anomalous or not), a method whose validity is based on the Condorcet Jury theorem from political science. The theorem addresses the relative probability of a given group of individuals arriving at a correct decision. Such a technique may be applicable to a group that wishes to reach a decision by majority vote. One of the two outcomes of the vote is correct, and each voter has an independent probability p of voting for the correct decision. The theorem asks how many voters should be included in the group. The result depends on whether p is greater than or less than ½. That is, if p is greater than ½ (each voter is more likely to vote correctly), then adding more voters increases the probability that the majority decision is correct. In the limit, the probability that the majority votes correctly approaches 1 as the number of voters increases. On the other hand, if p is less than ½ (each voter is more likely to vote incorrectly), then adding more voters makes things worse: the optimal jury consists of a single voter.

The majority vote of binary readings may be used in ensemble learning in the field of artificial intelligence. An ensemble method combines the predictions of many individual classifiers by majority voting. Assuming that each of the individual classifiers predict with slightly greater than 50% accuracy, then the ensemble of their predictions will be far greater than their individual predictive scores. While useful, this technique suffers from the fact that it can only address a binary situation, as to whether or not the voltage is above or below a given set point. It thus misses a lot of fine detail that might be of relevance to monitor the state of various systems including power grids.

A major improvement over majority voting is disclosed herein and is illustrated in one example by ranking the relative readings of all sensors involved using a new variant of Borda Counting. One key advantage of this new method over simply finding the "worst" case sensor, is that the entire sensor suite is ranked so that the most extreme n sensors can be identified. The Borda count is intended to elect broadly-acceptable options, rather than those preferred by a majority, and so is known as a consensus-based voting system rather than a majoritarian one.

A network has both local and system-wide issues. Local issues can be investigated by analyzing data emanating from a single modem connected to a power supply in the grid. System wide issues involve multiple sensors/modems distributed over an area that stream data which fluctuates over time. Here we describe a method that creates a consensus among many sensors and provides information on a system-wide basis or among clusters within the network. The system does not identify particular nodes that are causing a problem, only that the overall network or significant parts of it are mis-behaving in a particular way, i.e., one or more sensors are far out of range in a significant part of the network.

In one embodiment, this consensus voting method can be applied to sensor data collected on a power grid. In one example voltage issues in network devices within a given area and timeframe can be classified using both unsupervised learning and sensor fusion techniques. This method enlarges the scope of data analysis from single sensors to any number of those covering a potentially large given area. The architecture considered here consists of a number of devices, each of which has one or more sensor values associated with it (e.g., queue length, power level, latency, etc.) Each device may have different sensors measuring the certain quantities, possibly different levels of resolution and accuracy.

The technique may employ ranking the different sensor values for voting purposes. Sensor values can either have a pre-defined discretization or use historical data to define normalized ranges. For example, in the discrete case a three-state scheme could be green-yellow-red and the node would rank its current state preferences based on these three candidate choices—e.g., yellow-red-green, yellow-green-red, etc. In this example, if the value of the sensor is in the yellow range then yellow is top choice, and if the sensor value is closer to red than green, then red is the second choice.

In one example embodiment, a search for issues with voltages in a particular area at a given time can be completed. The voltage thresholds can be broken into 5 classes as a ratio of the 120V reference voltages and their respective labels are shown in Table 1, below.

TABLE 1

| Example Voltage Labels | |
|---|---|
| Voltage (120 V) | Label |
| (1.05, inf) | 5 |
| (1.02, 1.05] | 4 |
| (0.98, 1.02] | 3 |
| (0.95, 0.98] | 2 |
| [0, 0.95] | 1 |

Depending on the measured voltage, the device will be in one of the 5 states listed in the example shown in Table 1. These values can be used in conjunction with a Borda ranking as follows. For a given voltage the ranking is made according to the labels in order of their closeness to the given voltage. For example, if the given voltage is in the range [1.02, 1.03] then the Borda ranking is, in order of the labels, [1, 2, 5, 3, 4]. That is, label 4 gets a rank of 5 because the voltage is in the window of 4 and closer to label 3 than 5, etc. The results obtained from this example are shown in Tables 2 and 3, along with the majority vote results described above.

TABLE 2

| Majority and Borda Voting with 100 clusters. | | |
|---|---|---|
| Majority label | Borda Label | % Cases |
| 5 | 5 | 3 |
| 5 | 4 | 69 |
| 4 | 4 | 27 |
| 3 | 4 | 1 |

As can be seen, there are cases where the majority vote and the consensual Borda count disagree on the state of the cluster. These differences can have implications for any actions to take. In particular, most of the majority labels are 5, which is the maximum out of bound range which could indicate a significant action should be taken. However, Borda count found the consensus voltage label to be only a 4, which requires less intervention. In this scenario the device owners may make unnecessary and costly changes if they used a majority voting scenario.

TABLE 3

| Majority and Borda Voting with 200 clusters | | |
|---|---|---|
| Majority Label | Borda Label | % Cases |
| 5 | 5 | 1 |
| 5 | 4 | 57 |
| 4 | 4 | 41.5 |
| 3 | 4 | 0.5 |

Figure 7:
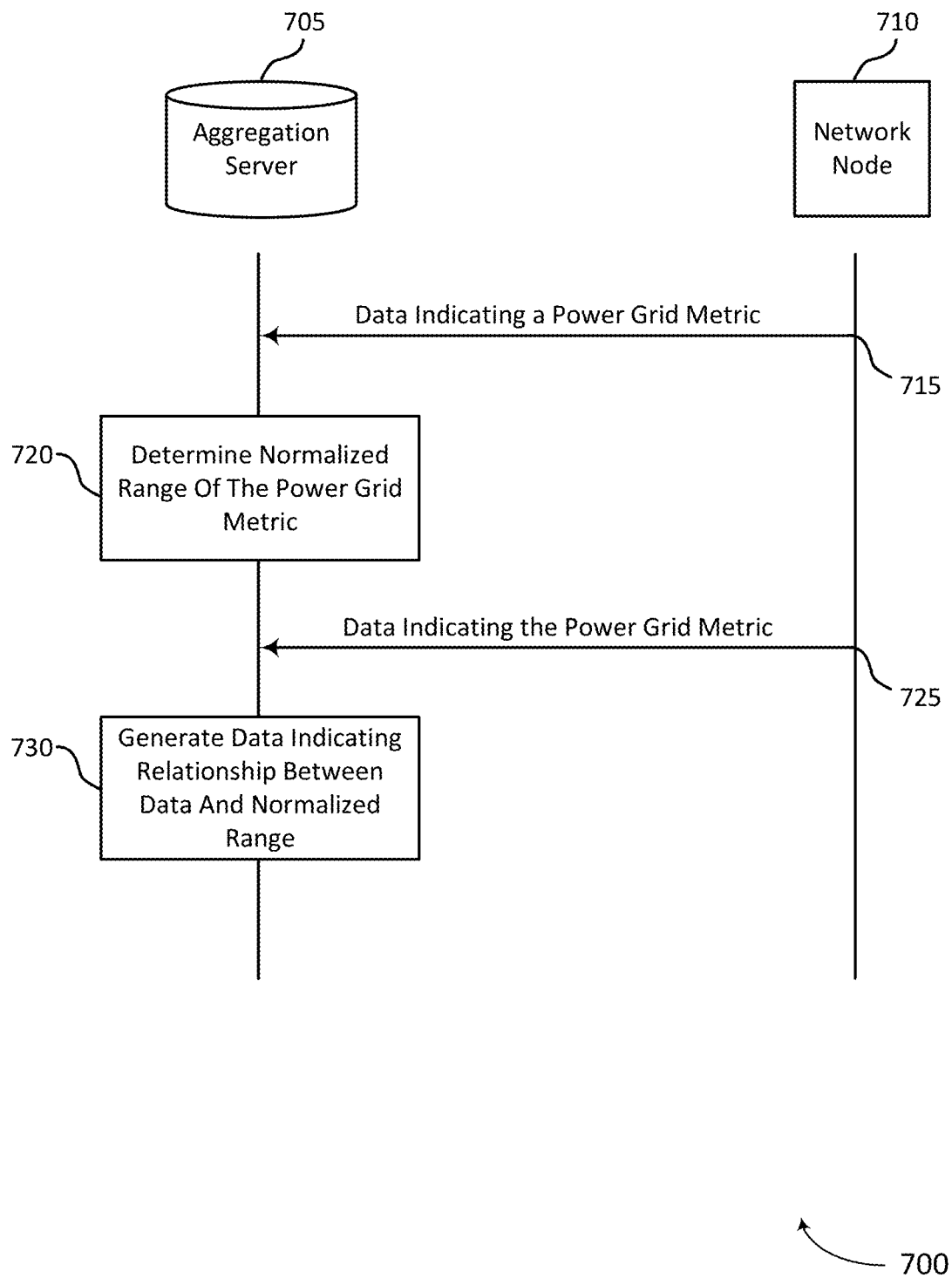
FIGS. 7 through 10 illustrates an example of process flows that support distributed, secure, power grid data collection, consensual voting analysis, and situational awareness and anomaly detection in accordance with aspects of the present disclosure.

FIG. 7 illustrates an example of a process flow 700 that supports distributed, secure, power grid data collection, consensual voting analysis, and situational awareness and anomaly detection in accordance with aspects of the present disclosure. In some examples, FIG. 7 may illustrate aspects of FIGS. 1 through 6. For example, the aggregation server 705 may be an example of the aggregation servers as described with reference to FIGS. 1 through 6. Additionally, the network node 710 may be an example of a network node or a head-end as described with reference to FIGS. 1 through 6. The network node 710 and the aggregation server 705 may perform functions and communications to monitor a power grid. For example, the network nodes 710 may be network nodes 710 within a communications network such as a fiber or cable communications network. The network nodes 710 may provide a communication service to locations (e.g., including end devices) that are powered by the power grid. Thus, the network nodes 710 may receive data from sensors coupled with the power grid and communicate the data via the communications network to the aggregation server 705 for processing. The network nodes 710 may be powered by the power grid (e.g., as a primary power source), and may have a secondary or backup power source.

At 715, one or more network nodes 710 may communicate, to the aggregation server 705, data indicating a power grid metric. The one or more network nodes 710 may be coupled with one or more sensors. The sensors may be configured to monitor the metric associated with the power grid. For example, each network node 710 may be coupled with at least one sensor configured to monitor a voltage level associated with the power grid. In some cases, each network node 710 may be coupled to a sensor configured to monitor more than one metric associated with the power grid (or more than one sensor, each configured to monitor a different metric). Here, the network node 710 may collect data related to more than metric associated with the power grid (e.g., voltage, current, frequency, phase, phase jitter, power quality, or power factor). The data may include a set of values from each network node 710 indicating the metrics, each value determined by a different sensor.

At 720, the aggregation server 705 may determine normalized ranges of the power grid metrics indicated by the data received at 715. The aggregation server 705 may determine the normalized ranges by determining consensus values of the metrics indicated by the data (e.g., the first set of data). The aggregation server 705 may determine the consensus values by Borda counting and/or Borda ranking. That is, the data indicating the power grid metrics may include a ranking of a possible list of quantized values (or, in some cases, a range) of the power grid metrics (e.g., as described with reference to FIG. 6). Additionally or alternatively, the aggregation server may determine the ranking of the possible list of quantized values of the power grid metrics based on the power grid metric values indicated by the data received by the aggregation server 705 at 715. Thus, the aggregation server may determine, based on the consensual Borda count, normalized ranges of the power grid metrics. In some cases, the aggregation server 705 may determine normalized ranges for the power grid metrics according to one or more factors. For example, the aggregation server 705 may determine normalized ranges for the power grid metrics based on a time of day, a time of year, or a geographical region. In some cases, the aggregation server 705 may determine respective normalized ranges for each of a plurality of network nodes. For example, the aggregation server 705 may determine respective normalized ranges by applying Borda counting and/or Borda ranking to multiple measurements (e.g., over time) or by including (e.g., weighted) measurements from other network nodes that are proximate (e.g., geographically or based on network topology).

At 725, the network node 710 may communicate a second set of data indicating the power grid metrics. The second set of data may indicate the same power grid metrics and be collected by a same set of sensors (e.g., as the data communicated to the aggregation server 705 at 715).

At 730, the aggregation server 705 may generate data (e.g., a third set of data) indicating a relationship between the second set of data received at 725 and the normalized ranges of the power grid metrics determined at 720. For example, the aggregation server 705 may generate a third set of data indicating the consensus value indicated by the second set of data received at 725 with respect to the normalized ranges. In another example, the aggregation server 705 may generate a third set of data indicating a most out of range sensor (e.g., type of sensor associated with a given metric). Here, the network node 710 may communicate data associated with more than one metric (e.g., voltage and current). The aggregation server 705 may determine which set of sensors (e.g., sensors measuring voltage, sensors measuring current) indicate a consensus value that is most different than the normalized range for that power grid metric. Additionally or alternatively, the aggregation server 705 may determine which sensor (e.g., associated with the network node 710 or a different network node) detects a value within the data indicated at 725 that is most out of range when compared to the normalized range or with its respective normalized range.

Figure 8:
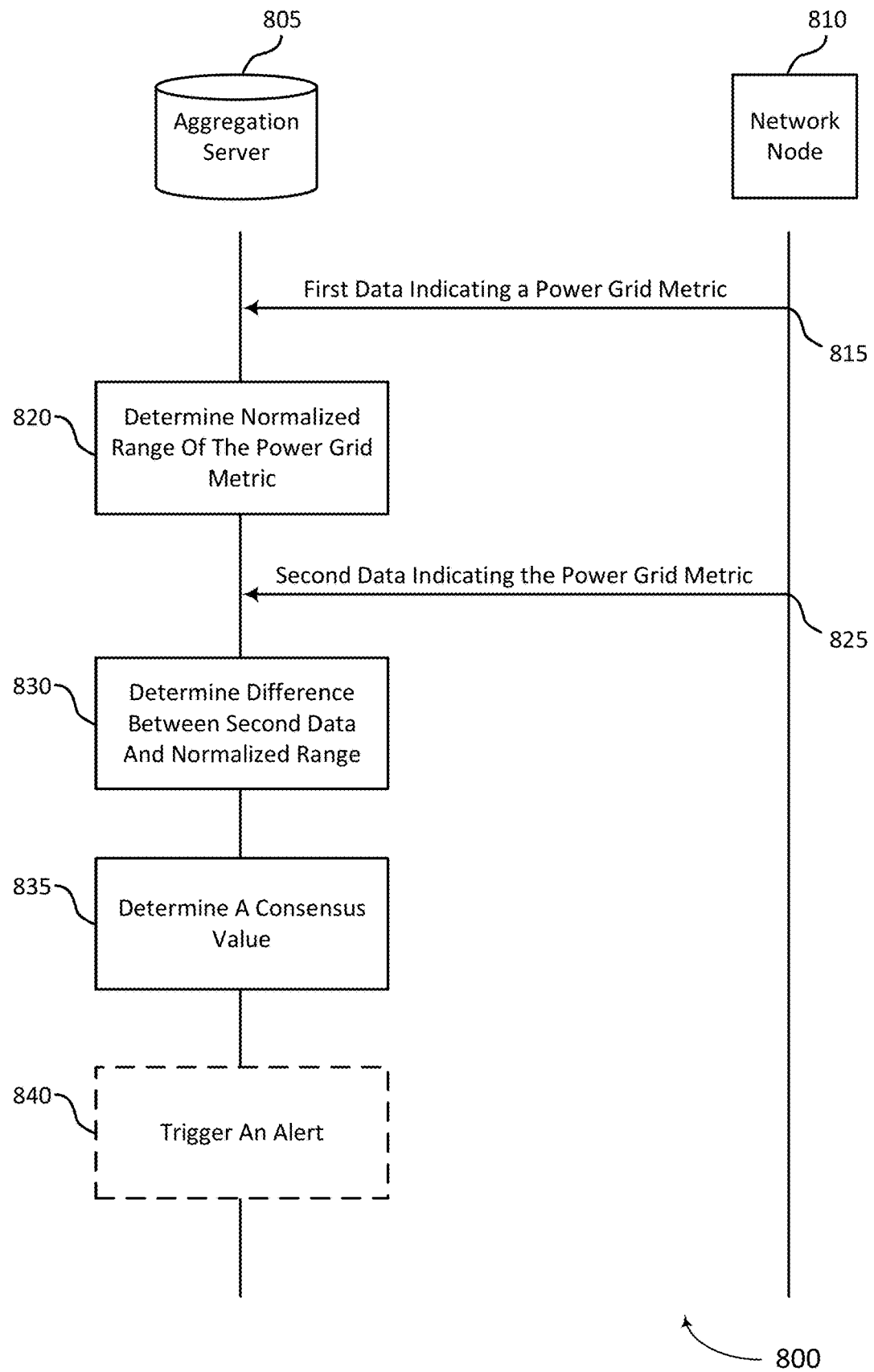

FIG. 8 illustrates an example of a process flow 800 that supports distributed, secure, power grid data collection, consensual voting analysis, and situational awareness and anomaly detection in accordance with aspects of the present disclosure. In some examples, FIG. 8 may illustrate aspects of FIGS. 1 through 7. For example, the aggregation server 805 may be an example of the aggregation servers as described with reference to FIGS. 1 through 6. Additionally, the network node 810 may be an example of a network node or a head-end as described with reference to FIGS. 1 through 7. The network node 810 and the aggregation server 805 may perform functions and communications to monitor a power grid. For example, the network nodes 810 may be network nodes 810 within a communications network such as a fiber or cable communications network. The network nodes 810 may provide a communication service to locations (e.g., including end devices) that are powered by the power grid. Thus, the network nodes 810 may receive data from sensors coupled with the power grid and communicate the data via the communications network to the aggregation server 805 for processing. The network nodes 810 may be powered by the power grid (e.g., as a primary power source), and may have a secondary or backup power source.

At 815, one or more network nodes 810 may communicate, to the aggregation server 805, data indicating a power grid metric. The one or more network nodes 810 may be coupled with one or more sensors. The sensors may be configured to monitor the metric associated with the power grid. For example, each network node 810 may be coupled with at least one sensor configured to monitor a voltage level associated with the power grid. In some cases, each network node 810 may be coupled to a sensor configured to monitor more than one metric associated with the power grid (or more than one sensor, each configured to monitor a different metric). Here, the network node 810 may collect data related to more than metric associated with the power grid (e.g., voltage, current, frequency, phase, phase jitter, power quality, or power factor). The data may include a set of values indicating the metric, each value determined by a different sensor.

At 820, the aggregation server 805 may determine a normalized range of the power grid metric indicated by the data received at 815. The aggregation server 805 may determine the normalized range by determining a consensus value of the metric indicated by the data (e.g., the first set of data). The aggregation server 805 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the power grid metric values indicated by the data received by the aggregation server 805 at 815. Thus, the aggregation server may determine, based on the consensual Borda count, a normalized range of the power grid metric. In some cases, the aggregation server 805 may determine a normalized range for the power grid metric according to one or more factors. For example, the aggregation server 805 may determine a normalized range for the power grid metric based on a time of day, a time of year, or a geographical region. In some cases, the aggregation server 805 may determine respective normalized ranges for each of a plurality of network nodes. For example, the aggregation server 805 may determine respective normalized ranges by applying Borda counting and/or Borda ranking to multiple measurements (e.g., over time) or by including (e.g., weighted) measurements from other sensors that are proximate (e.g., geographically or based on network topology).

At 825, the network node 810 may communicate a second set of data indicating the power grid metrics. The second set of data may indicate the same power grid metrics and be collected by a same set of sensors (e.g., as the data communicated to the aggregation server 805 at 815). The second set of data may include a set of values of the power grid metrics measured by sensors. Alternatively, the second set of data may include a ranking of a possible list of quantized values (or possible ranges for the power grid metrics).

At 830, the aggregation server 805 may determine a fourth set of data indicating a relationship between the quantized set of values of the power grid metrics and the normalized ranges of the power grid metric. If the second set of data includes a set of values of the power grid metrics measured by the sensors, the aggregation server 805 may determine a possible list of quantized values associated with each of the set of values within the second set of data. The aggregation server 805 may then determine a difference between the quantized values associated with the power grid metrics and the normalized ranges of the power grid metrics.

Equation 1, shown below, illustrates an example technique utilized by the aggregation server 805 to determine the difference between the values within the second set of data and the normalized range of the power grid metric.

$$z_{ij} = (x_{ij}(t) - \text{ref}_{ij})/\sigma_{ij} \tag{1}$$

In Equation 1, j may correspond to a sensor type. For example, j may correspond to a sensor configured to monitor voltage, current, frequency, phase, phase jitter, power quality, and/or power factor of the power grid. Additionally, i may correspond to a specific network node 810. That is, the second set of data received at 825 may include data from more than one network node 810. Further, $x_{ij}(t)$ may correspond to a value (e.g., measured by a sensor type j and from the network node 810 indicated by i) received or measured at time t, $\text{ref}_{ij}$ may correspond to the normalized value or range determined at 830, and $\sigma_{ij}$ may correspond fluctuation levels. For example, $\sigma_{ij}$ may be calculated based on expected fluctuations and noise of the sensors, or a standard deviation calculated based on a rolling history of values for each sensor type j. In some examples, $z_{ij}$ may correspond to a z-score of the sensor or network node 810. The z-score may indicate a difference between the value indicated by the sensor or network node 810 from the normalized range $\text{ref}_{ij}$ determined at 830.

At 835, the aggregation server 805 may determine a consensus value associated with the z-scores of each of the values within the second set of data. In some cases, the aggregation server 805 may determine the consensus value by Borda counting and Borda ranking. Additionally or alternatively, the aggregation server 805 may weight the z-score associated with each network node 810 or sensor. For example, the aggregation server 805 may weight the z-score based on the fluctuation level of the sensor associated with the node 810 (e.g., $1/\sigma_j$). Additionally, the aggregation server 805 may determine the weight according to Equation 2, shown below.

$$wgt_j = \exp\left(\frac{-\sigma_j}{\langle\sigma\rangle}\right) \tag{2}$$

Here, the weighting of the z-score $wgt_j$ may be a function (e.g., an exponential function) of the fluctuation level of the sensor–$\sigma_j$ and the average fluctuation level $\langle\sigma\rangle$. In another example, the aggregation server 805 may weight the z-score based on a norm calculated (e.g., a p-norm). Here, the z-score may be calculated as shown below, in Equation 3.

$$\text{Score}_c = (\Sigma_v^T \text{score}_z^p)^{1/p} \tag{3}$$

Here, the score may correspond to the z-score, v may be a measured sensor value, T may be a total number of values, and c may be the sensor considered. In another example, the aggregation server 805 may weight the z-score based on a historical likelihood that the sensor or network node 810 indicated a value that is similar to or the same as a previously-determined consensus value (e.g., historical correlation to the consensus value). In another example, the aggregation server 805 may weight the z-score based on a relative amount of traffic the associated network node 805 sends and receives, a relative connectivity of the associated network node 805 to other network nodes 810 (e.g., a higher connectivity may correspond to a larger weight), and/or a relative impact on overall quality of service if the associated network node 810 goes down. For determining a consensus z-score of a given network node or a group of network nodes (e.g., a region), the z-scores of the group of network nodes or adjacent or proximate network nodes may be combined using a weighted combination or weighted Borda counting or weighted Borda ranking (e.g., according to quantized ranges of z-scores).

At 840, the aggregation server 805 may optionally trigger an alert. For example, the aggregation server 805 may compare the consensus value determined at 835 to a threshold value. If the consensus value satisfies the threshold (e.g., exceeds the threshold value), the aggregation server 805 may trigger an alert. The alert may indicate a decreased health of the power grid system based on the measured values of the power grid metric.

In some cases, the aggregation server 805 may determine network nodes or regions including one or more network nodes that have sensor values that are the furthest outliers by Borda counting or Borda ranking values for each of the network nodes or regions to determine consensus values associated with the network nodes or regions and comparing the resulting consensus values. The regions may be determined based on geographical boundaries (e.g., zip codes, geospatial information, city boundaries, county boundaries, and the like), and a given region may include power grids associated with one or more power providers or utilities. For example, at 825, the aggregation server 805 may receive a set of data (e.g., a fifth set of data) from a different set of network nodes indicating the power grid metrics. That is, the network nodes 810 may be a part of a first group of network nodes (e.g., associated with a first geographic region) and the different set of network nodes may be part of a second group of network nodes (e.g., associated with a second geographic region). The first and second groups of network nodes may be disjoint, or may partially overlap (e.g., some network nodes in adjacent regions may be included in Borda counting or Borda ranking). Here, the fifth set of data may include a set of values of the power grid metrics measured by sensors or a ranking of a possible list of quantized values of the power grid metrics.

The aggregation server 805 may determine a sixth set of data indicating a relationship between the quantized set of values of the power grid metrics (e.g., within the fifth set of data) and the normalized ranges of the power grid metric.

The aggregation server 805 may determine a consensus value associated with the z-scores of each of the values within the fifth set of data. The aggregation server 805 may compare the consensus values associated with the second set of data (e.g., for the first network node or group of network nodes) and the fifth set of data (e.g. for the second network node or group of network nodes) to determine the most out of range set of network nodes. In some cases, the aggregation server 805 may generate data (e.g., the third set of data) indicating the most out of range group of network nodes.

Figure 9:
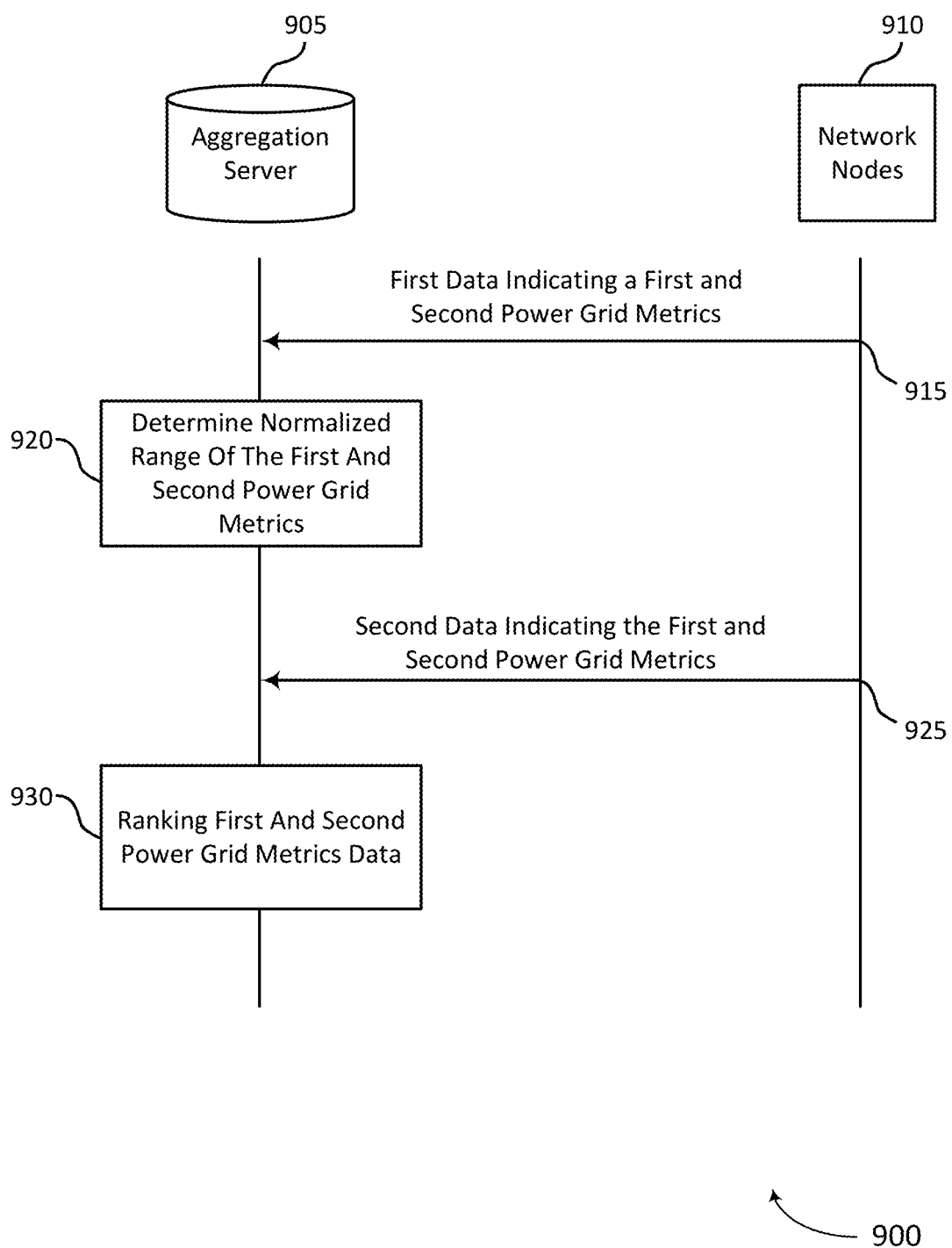

FIG. 9 illustrates an example of a process flow 900 that supports distributed, secure, power grid data collection, consensual voting analysis, and situational awareness and anomaly detection in accordance with aspects of the present disclosure. In some examples, FIG. 9 may illustrate aspects of FIGS. 1 through 8. For example, the aggregation server 905 may be an example of the aggregation servers as described with reference to FIGS. 1 through 8. Additionally, the network node 910 may be an example of a network node or a head-end as described with reference to FIGS. 1 through 8. The network nodes 910 and the aggregation server 905 may perform functions and communications to monitor a power grid. For example, the network nodes 910 may be network nodes 910 within a communications network such as a fiber or cable communications network. The network nodes 910 may provide a communication service to locations (e.g., including end devices) that are powered by the power grid. Thus, the network nodes 910 may receive data from sensors coupled with the power grid and communicate the data via the communications network to the aggregation server 905 for processing. The network nodes 910 may be powered by the power grid (e.g., as a primary power source), and may have a secondary or backup power source.

At 915, network nodes 910 may communicate, to the aggregation server 905, data indicating a first power grid metric and a second power grid metric. For example, the network nodes 910 may be coupled with a first set of sensors configured to measure a first power grid metric and a second set of sensors configured to measure a second power grid metric. In some cases, one or more of the sensors may be configured to measure both the first and second power grid metric.

At 920, the aggregation server 905 may determine a normalized range of the first and second power grid metrics indicated by the data received at 915. The aggregation server 905 may determine the normalized range by determining a consensus value of the metric indicated by the data (e.g., the first set of data). The aggregation server 905 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the first and second power grid metric values indicated by the data received by the aggregation server 905 at 915. Thus, the aggregation server may determine, based on the consensual Borda count, normalized ranges of the first and second power grid metrics. In some cases, the aggregation server 905 may determine normalized ranges for the power grid metrics according to one or more factors. For example, the aggregation server 905 may determine normalized ranges for the power grid metrics based on a time of day, a time of year, or a geographical region.

At 925, the network node 910 may communicate a second set of data indicating the first and second power grid metrics. The second set of data may include a set of values of the power grid metric measured by sensors. Alternatively, the second set of data may include a ranking of a possible list of quantized values (or possible ranges for the power grid metric).

At 930, the aggregation server 905 may rank the first and second power grid metrics. That is, the aggregation server 905 may determine which of the first or second power grid metrics are most out of range. For example, the aggregation server 905 may determine a z-score for the first and second power grid metrics. In some cases, the aggregation server 905 may determine the z-score as described by Equation 1. The aggregation server 905 may, in some cases, weight the z-scores as described with reference to FIG. 8.

The aggregation server 905 may rank each network node 910 according to its z-score, as shown below with reference to Equation 4.

$$\text{rank}_{ij} = \text{sort}(z_{ij}) \quad (4)$$

In Equation 4, the highest outlier (e.g., the network node 910 associated with a largest z-score) may have a rank N, where N is the number of sensor values for each network node. The aggregation server 905 may collect all the rank vectors (e.g., determined by Equation 4) and perform a Borda count for each sensor type (e.g., associated with the first power grid metric or the second power grid metric) according to Equation 5, shown below.

$$\text{vote}_j = \Sigma_i \text{rank}_{ij}$$

Accordingly, the sensor type with the most votes may correspond to the consensus most positively out of range sensor and the least votes may correspond to the most negatively out of range sensor. In some cases, if a network node 910 does not report a value for the power grid metric, the network node 910 may have not have a rank, which may not affect the highest vote-getters but may influence the vote count of the lowest vote-getter. In some cases, this may be rectified by 'range voting,' where the average rank is computed. Alternatively, the median rank may be used instead of the average. In either case, the missing data (e.g., a network node 910 that does not report a value) may not influence the vote.

Figure 10:
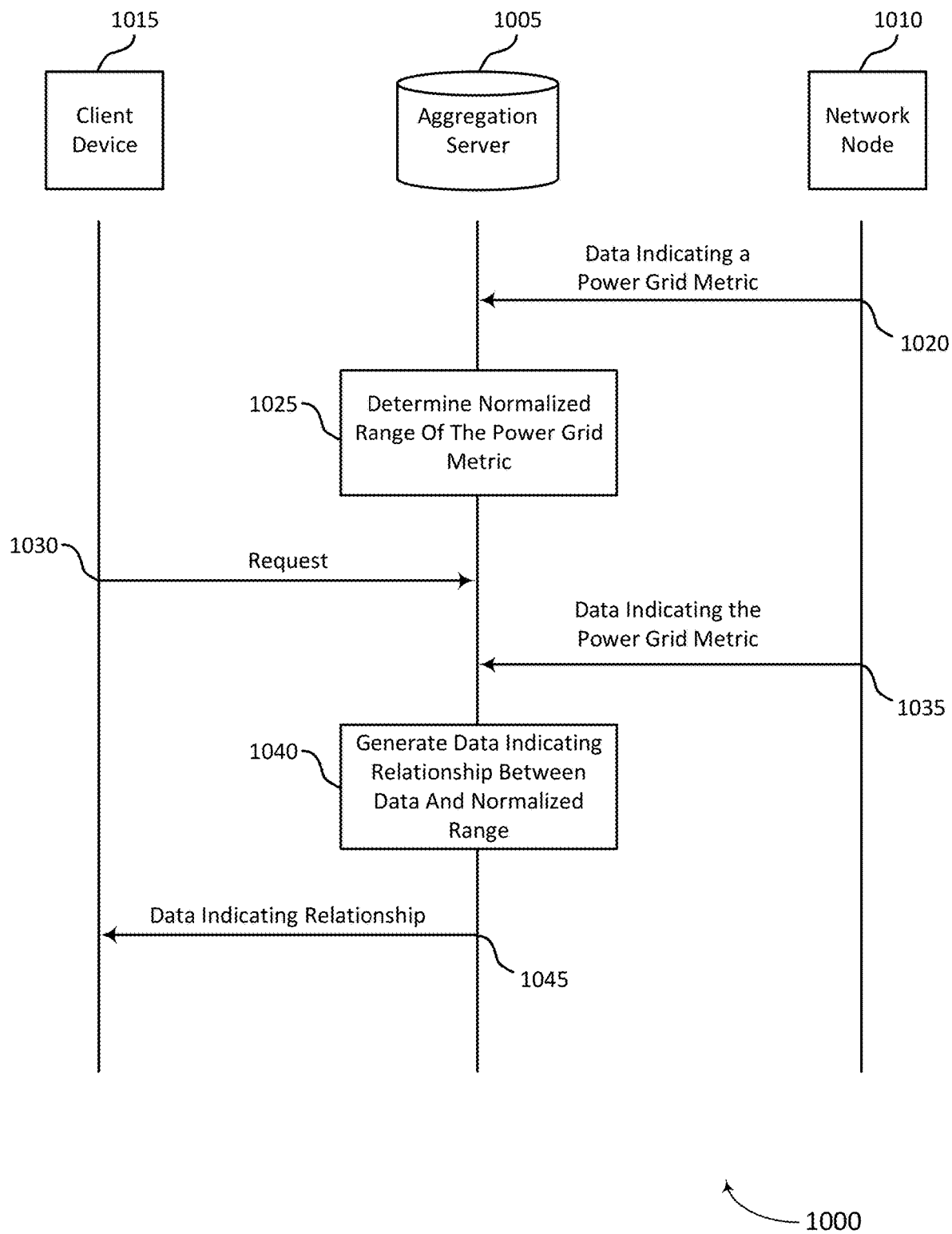

FIG. 10 illustrates an example of a process flow 1000 that supports distributed, secure, power grid data collection, consensual voting analysis, and situational awareness and anomaly detection in accordance with aspects of the present disclosure. In some examples, FIG. 10 may illustrate aspects of FIGS. 1 through 9. For example, the aggregation server 1005 may be an example of the aggregation servers as described with reference to FIGS. 1 through 9. Additionally, the network node 1010 may be an example of a network node or a head-end as described with reference to FIGS. 1 through 9. The network node 1010 and the aggregation server 1005 may perform functions and communications to monitor a power grid. For example, the network nodes 1010 may be network nodes 1010 within a communications network such as a fiber or cable communications network. The network nodes 1010 may provide a communication service to locations (e.g., including end devices) that are powered by the power grid. Thus, the network nodes 1010 may receive data from sensors coupled with the power grid and communicate the data via the communications network to the aggregation server 1005 for processing. The network nodes 1010 may be powered by the power grid (e.g., as a primary power source), and may have a secondary or backup power source. The process flow 1000 may further include a client device 1015. The client device 1015 may be configured to communicate with the aggregation server 1005.

At 1020, one or more network nodes 1010 may communicate, to the aggregation server 1005, data indicating a power grid metric. The one or more network nodes 1010 may be coupled with one or more sensors. The sensors may be configured to monitor the metric associated with the power grid. For example, each network node 1010 may be coupled with at least one sensor configured to monitor a voltage level associated with the power grid. In some cases, each network node 1010 may be coupled to a sensor configured to monitor more than one metric associated with the power grid (or more than one sensor, each configured to monitor a different metric). Here, the network node 1010 may collect data related to more than metric associated with the power grid (e.g., voltage, current, frequency, phase, phase jitter, power quality, or power factor). The data may include a set of values indicating the metric, each value determined by a different sensor or combination of sensors.

At 1025, the aggregation server 1005 may determine a normalized range of the power grid metric indicated by the data received at 1020. The aggregation server 1005 may determine the normalized range by determining a consensus value of the metric indicated by the data (e.g., the first set of data). The aggregation server 1005 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the power grid metric values indicated by the data received by the aggregation server 1005 at 1020. Thus, the aggregation server may determine, based on the consensual Borda count, a normalized range of the power grid metric. In some cases, the aggregation server 1005 may determine a normalized range for the power grid metric according to one or more factors. For example, the aggregation server 1005 may determine a normalized range for the power grid metric based on a time of day, a time of year, or a geographical region.

At 1030, the aggregation server 1005 may receive a request from the client device 1015. For example, the client device 1015 may be associated with a power supplier. The request may include a request for a set of data (e.g., a third set of data) associated with a geographical region including a subset of the network nodes 1010 in communication with the aggregation server 1005.

At 1035, the one or more network nodes 1010 may communicate a second set of data indicating the power grid metric. In some cases, the one or more network nodes 1010 may be the same network nodes 1010 indicated within the request. The second set of data may indicate the same power grid metric and be collected by a same set of sensors (e.g., as the data communicated to the aggregation server 1005 at 1015).

At 1040, the aggregation server 1005 may generate data (e.g., the third set of data) indicating a relationship between the second set of data received at 1025 and the normalized range of the power grid metric determined at 1020. In some cases, the third set of data may be the data requested by the client device 1015 at 1030. The aggregation server 1005 may generate a third set of data indicating the consensus value indicated by the second set of data received at 1025 with respect to the normalized range. In another example, the aggregation server 1005 may generate a third set of data indicating a most out of range sensor. Here, the network node 1010 may communicate data associated with more than one metric (e.g., voltage and current). The aggregation server 1005 may determine which set of sensors (e.g., sensors measuring voltage, sensors measuring current) indicate a consensus value that is most different than the normalized range for that power grid metric. Additionally or alternatively, the aggregation server 1005 may determine which sensor (e.g., associated with the network node 1010 or a different network node) detects a value within the data indicated at 1025 that is most out of range when compared to the normalized range.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
  receiving, via a communications network from a plurality of network nodes of the communications network, a first set of data indicating a metric associated with a power grid, the communications network configured to provide a communication service to end devices at locations serviced by the power grid, wherein the plurality of network nodes use the power grid as a primary source of power;
determining a normalized range for the metric associated with the power grid based at least in part on the first set of data;
receiving, via the communications network from the plurality of network nodes of the communications network, a second set of data indicating the metric associated with the power grid; and
generating a third set of data indicating a relationship between the second set of data and the normalized range for the metric;
identifying a fourth set of data comprising an ordering, for each of the plurality of network nodes, of a set of quantized values according to values determined from the second set of data corresponding to the each of the plurality of network nodes; and
determining a consensus value from the ordered sets of quantized values associated with the plurality of network nodes, wherein the third set of data comprises the consensus value.

2. The method of claim 1, wherein the values determined from the second set of data comprise differences between the second set of data and the normalized range for the metric.

3. The method of claim 1, wherein determining the consensus value comprises:
weighting one or more of the quantized values of the ordered set of quantized values for one or more of the plurality of network nodes based at least in part on a function of respective values of the second set of data for the one or more of the plurality of network nodes, a function of a difference between the ordered set of quantized values for a previous determination of the consensus value and the previously determined consensus value, an amount of traffic communicated via the one or more of the plurality of network nodes, a connectivity metric for the one or more of the plurality of network nodes, a relative network impact of unavailability of the one or more of the plurality of network nodes, or a combination thereof.

4. The method of claim 1, wherein identifying the fourth set of data comprises:
identifying the set of quantized values for the metric associated with the power grid; and
ordering the set of quantized values for each of the plurality of network nodes according to the values of the third set of data to generate the fourth set of data.

5. The method of claim 1, wherein the second set of data received from the plurality of network nodes comprises the fourth set of data.

6. The method of claim 1, further comprising:
triggering an alert based at least in part on determining that the consensus value satisfies a threshold.

7. The method of claim 1, further comprising:
identifying a fifth set of data comprising an ordering, for each of a second plurality of network nodes, of a second set of quantized values according to values determined from the second set of data corresponding to the each of the plurality of network nodes; and
determining a second consensus value from the ordered second sets of quantized values associated with the second plurality of network nodes, wherein the third set of data is based at least in part on a comparison of the consensus value and the second consensus value.

8. The method of claim 1, wherein the metric associated with the power grid is a first metric associated with the power grid, the method further comprising:
receiving, via the communications network from the plurality of network nodes of the communications network, a fourth set of data indicating a second metric associated with the power grid different than the first metric associated with the power grid; and
ranking the second set of data and the fourth set of data based at least in part on a magnitude of a difference between respective values of the second set of data and the fourth set of data and respective normalized ranges of the first metric and the second metric, wherein the third set of data is based at least in part on the ranking.

9. The method of claim 8, wherein:
generating the third set of data comprises accumulating the rankings of the second set of data and the fourth set of data.

10. The method of claim 9, wherein:
generating the third set of data comprises weighting the rankings of the second set of data and the fourth set of data.

11. The method of claim 10, wherein the weighting is based at least in part on a function of respective values of the rankings of the second set of data and the fourth set of data, a function of a difference between the second set of data and the fourth set of data and normalized ranges for the first metric and the second metric, an amount of traffic communicated via respective network nodes of the plurality of network nodes, a connectivity metric for respective network nodes the plurality of network nodes, a relative network impact of unavailability of respective network nodes of the plurality of network nodes, or a combination thereof.

12. A method, comprising:
receiving, via a communications network from a plurality of network nodes of the communications network, a first set of data indicating a metric associated with a power grid, the communications network configured to provide a communication service to end devices at locations serviced by the power grid, wherein the plurality of network nodes use the power grid as a primary source of power;
determining a normalized range for the metric associated with the power grid based at least in part on the first set of data;
receiving, via the communications network from the plurality of network nodes of the communications network, a second set of data indicating the metric associated with the power grid; and
generating a third set of data indicating a relationship between the second set of data and the normalized range for the metric;
receiving a request for the third set of data associated with a geographical region comprising a subset of the plurality of network nodes from a third party;
determining the third set of data for the geographical region based at least in part on the second set of data for the subset of the plurality of network nodes; and
communicating the third set of data for the geographical region to the third party.

13. The method of claim 12, wherein determining the third set of data for the geographical region comprises:
determining the third set of data based at least in part on the second set of data for the subset of the plurality of network nodes and at least one network node of the plurality of network nodes not within the subset of the plurality of network nodes.

14. The method of claim 13, wherein determining the third set of data for the geographical region comprises:
  weighting values determined from the second set of data for the subset of the plurality of network nodes and the at least one network node based at least in part on locations of the subset of the plurality of network nodes and the at least one network node relative to the geographical region.

\* \* \* \* \*